(12) United States Patent
Fotheringham et al.

(10) Patent No.: US 10,135,113 B2
(45) Date of Patent: Nov. 20, 2018

(54) SATELLITE COMMUNICATION TERMINAL WITH RECONFIGURABLE SUPPORT STRUCTURES

(71) Applicants: David Fotheringham, Snohomish, WA (US); Adam Nonis, Seattle, WA (US)

(72) Inventors: David Fotheringham, Snohomish, WA (US); Adam Nonis, Seattle, WA (US)

(73) Assignee: KYMETA CORPORATION, Redmond, WA (US)

( * ) Notice: Subject to any disclaimer, the term of this patent is extended or adjusted under 35 U.S.C. 154(b) by 3 days.

(21) Appl. No.: 15/598,238

(22) Filed: May 17, 2017

(65) Prior Publication Data

US 2017/0338540 A1 Nov. 23, 2017

Related U.S. Application Data

(60) Provisional application No. 62/339,715, filed on May 20, 2016.

(51) Int. Cl.
*H01Q 1/42* (2006.01)
*H01Q 1/12* (2006.01)
(Continued)

(52) U.S. Cl.
CPC ......... *H01Q 1/1264* (2013.01); *B64G 1/1007* (2013.01); *H01Q 1/1235* (2013.01);
(Continued)

(58) Field of Classification Search
CPC ............ H01Q 1/12; H01Q 1/288; H01Q 1/32; H01Q 1/42; H01Q 3/04; H01Q 15/00; H01Q 21/00; H01Q 5/50; H01Q 21/24
(Continued)

(56) References Cited

U.S. PATENT DOCUMENTS 3,229,941 A 1/1966 Suliteanu et al.
4,232,320 A 11/1980 Savalle, Jr.
(Continued)

OTHER PUBLICATIONS

PCT Appln. No. PCT/US17/33636, Search Report and Written Opinion dated Aug. 22, 2017, 15 pgs.
(Continued)

*Primary Examiner* — Andrea Lindgren Baltzell
(74) *Attorney, Agent, or Firm* — Womble Bond Dickinson (US) LLP

(57) ABSTRACT

Techniques and mechanisms for enabling the positioning of a communication terminal in or on a vehicle, building or other structure. In an embodiment, the communication terminal includes an electronically steerable antenna which is disposed in a housing. A plurality of support legs, coupled to the housing, are each configured to rotate about a respective first axis, and to further rotate about a respective second axis. For a given support leg, an orientation of the respective second axis varies with rotation of that support leg about the respective first axis. Two such support legs are mechanically coupled to one another with respect to their respective first axis rotations or with respect to their respective second axis rotations. In another embodiment, the communication terminal is operable by a user to selectively enable or disable first axis rotation and/or second axis rotation of a given support leg.

24 Claims, 26 Drawing Sheets

(51) Int. Cl.
| | |
|---|---|
| *B64G 1/10* | (2006.01) |
| *H01Q 1/28* | (2006.01) |
| *H01Q 1/32* | (2006.01) |
| *H01Q 3/04* | (2006.01) |
| *H04B 7/185* | (2006.01) |
| *H01Q 15/00* | (2006.01) |
| *H01Q 21/00* | (2006.01) |
| *H01Q 21/06* | (2006.01) |
| *H01Q 5/50* | (2015.01) |
| *H01Q 21/24* | (2006.01) |

(52) U.S. Cl.
CPC ........... *H01Q 1/288* (2013.01); *H01Q 1/3208* (2013.01); *H01Q 1/42* (2013.01); *H01Q 3/04* (2013.01); *H01Q 15/0086* (2013.01); *H01Q 21/0012* (2013.01); *H01Q 21/065* (2013.01); *H04B 7/18515* (2013.01); *H04B 7/18517* (2013.01); *H01Q 5/50* (2015.01); *H01Q 21/24* (2013.01)

(58) Field of Classification Search
USPC ........................................................ 343/713
See application file for complete search history.

(56) References Cited

U.S. PATENT DOCUMENTS

| | | | | |
|---|---|---|---|---|
| 5,945,961 | A * | 8/1999 | Price | ................. H01Q 3/08 343/757 |
| 5,995,062 | A * | 11/1999 | Denney | ................ H01Q 1/1235 343/700 MS |
| 2011/0043433 | A1 | 2/2011 | Klien | |

OTHER PUBLICATIONS

<http://www.thinkom.com/antenna-products/thinsat/300-2/> 4 pgs.
"Powering Satellite-on-the-Move for Bandwidth-Hungry Mobility Applications", <https://www.gilat.com/technologies/antennas/commercial/> 5 pgs.
"Thuraya IP+ Satellite Terminal", <https://www.outfittersatellite.com/thurayaip.html> 3 pgs.
Russell, Kendall, "HiSky Introduces Ka-Band Satellite Terminal for MSS and IoT", <http://www.satellitetoday.com/technology/2017/02/21/hisky-introduces-ka-band-satellite-terminal-mss-iot/> Feb. 21, 2017, 3 pgs.

* cited by examiner

200

210

Communicating signals through a housing with an electronically steerable antenna which is disposed in the housing

220

Rotating support legs each about a respective first axis which is fixed relative to the housing

230

Rotating the support legs each about a respective second axis which is variable with rotation of the leg about the respective first axis A = Solid black arrow denoting power feed vector from feed location to center of element
B = Dashed orthogonal lines showing perpendicular axes relative to "A"
C = Dashed rectangle encircling slot rotated 45 degrees relative to "B"

A = Elements whose rotation relative to feed pointing vector is equal to -45, comprising Group A
B = Elements whose rotation relative to feed pointing vector is equal to +45, comprising Group B

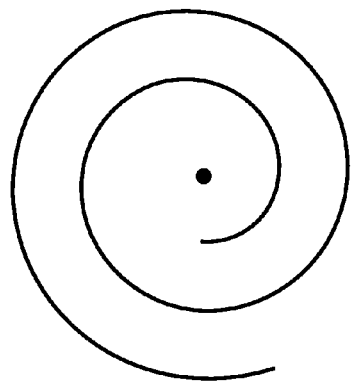
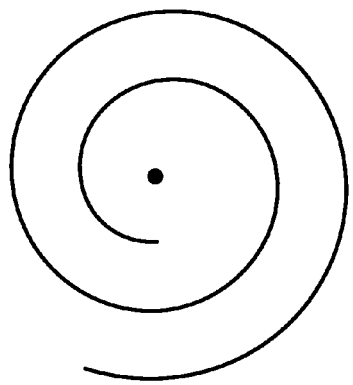
FIG. 21A    FIG. 21B
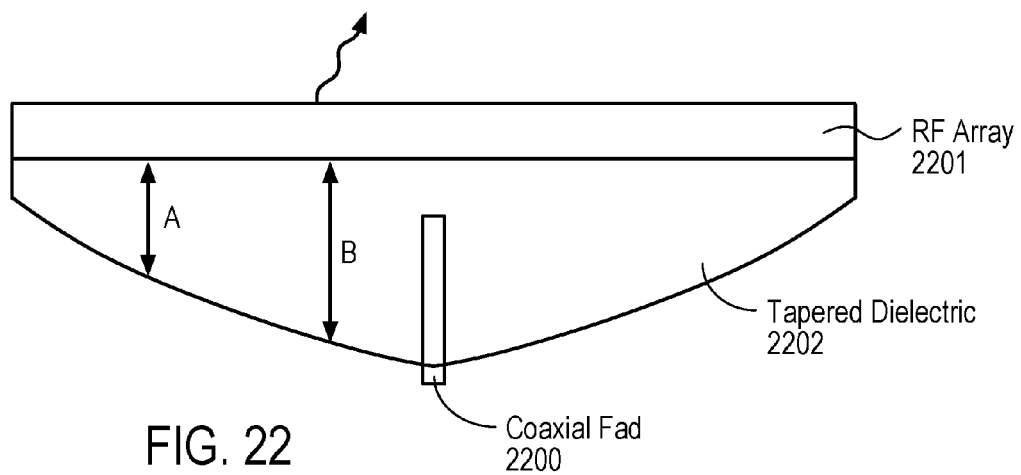
FIG. 22

SATELLITE COMMUNICATION TERMINAL WITH RECONFIGURABLE SUPPORT STRUCTURES

CROSS-REFERENCE TO RELATED APPLICATIONS

This application claims the benefit of a U.S. Provisional Application No. 62/339,715 filed on May 20, 2016, the entire contents of which are hereby incorporated by reference herein.

BACKGROUND

1. Technical Field

Embodiments discussed herein relate generally to satellite communication devices and more particularly, but not exclusively, to a configurable support for positioning a steerable antenna.

2. Background Art

Existing satellite systems usually include the use of dishes that are designed to be mounted on a stand, with the horn pointing in at the dish surface. For example, traditional Vehicle Mounted Earth Stations (VMESs), include various phased array devices, require motorization and mechanical pointing for some portion of their function. As a result, these systems occupy somewhat large footprints and tend to be inflexible or otherwise unaccommodating of adaptation for various use cases.

Wireless technologies, such as those for satellite communication, continue to grow in number, variety and capability. The continually-changing nature of these technologies poses challenges for some use cases. For example, there is an increasing demand to provide in-field, in-vehicle or on-vehicle solutions to support, replace or supplement the use of consumer smartphones and on-board cellular technology modules. However, cars, trucks and other vehicles vary significantly in their respective form factors, operational constraints and the like. This poses problems with respect to the integration or coupling of a given antenna system with a given vehicle. For at least these reasons, the market can benefit from satellite communication solutions that are flexible in design and resource efficient.

BRIEF DESCRIPTION OF THE DRAWINGS

The various embodiments of the present invention are illustrated by way of example, and not by way of limitation, in the figures of the accompanying drawings and in which:

FIGS. 21A and 21B illustrate right-hand circular polarization and left-hand circular polarization, respectively.

FIG. 22 illustrates a linear taper of a dielectric.

DETAILED DESCRIPTION

Figure 1:
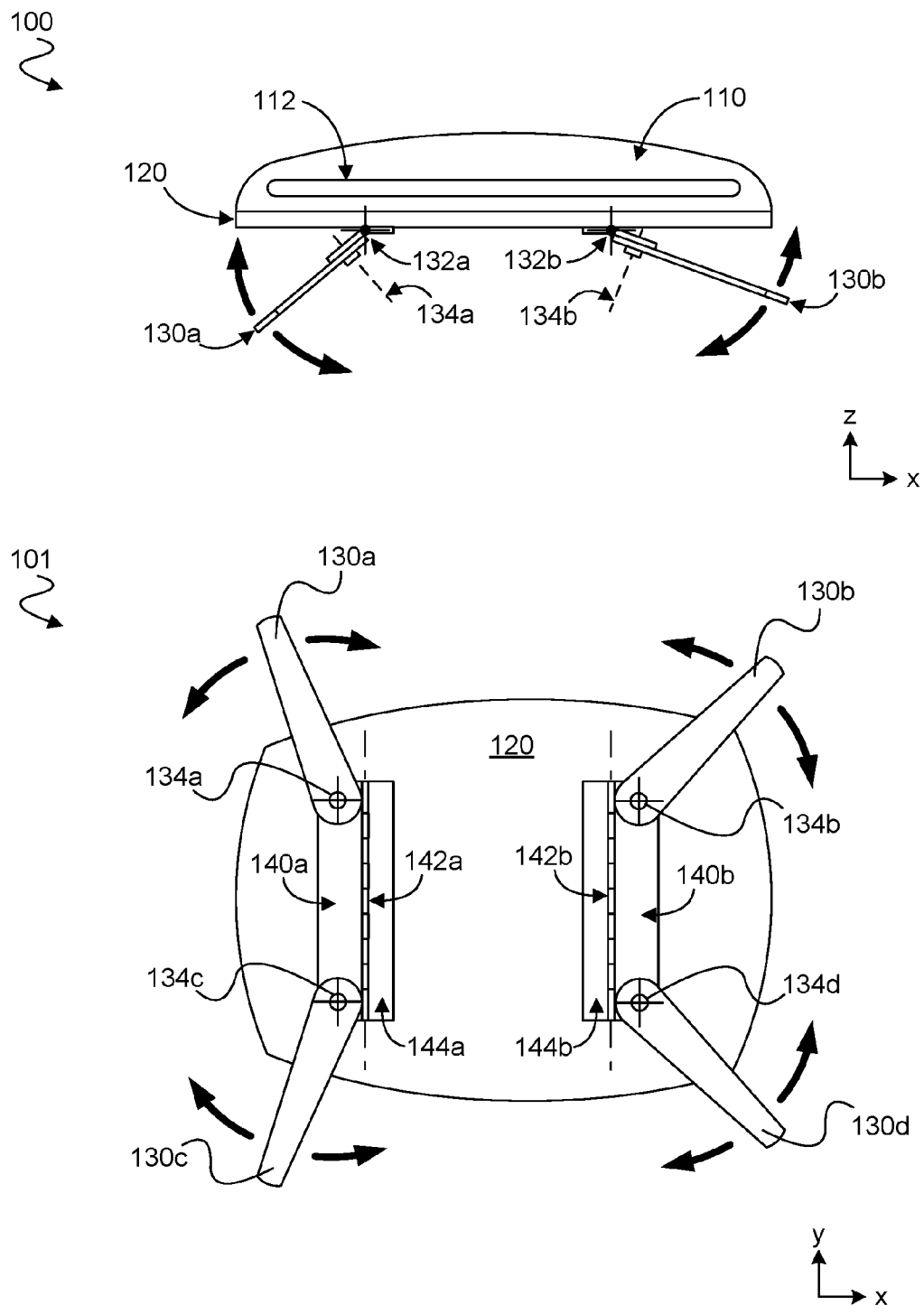
FIG. 1 shows elevation views of a system to operate as a communication terminal according to an embodiment.

Embodiments described herein variously provide a communication terminal which includes an antenna sub-system and additional structures which facilitate configuration of the communication terminal in any of a variety of positions. A satellite communication terminal according to one embodiment may be variously configured at different times (e.g., including reconfigured) for use while in or on a vehicle, while free standing on the ground, or the like. The terminal may further include or accommodate hardware to support attachment (e.g., bolting, clamping, suction, or the like) to a railing, building, flat surface or other structure.

The antenna sub-system may comprise an array of radio frequency (RF) elements—e.g., arranged in or on one or more antenna panel substrates. The antenna sub-system may also include, or be coupled to, circuitry to facilitate communication using the array of radio frequency (RF) elements. Such circuitry may include, but is not limited to, a block upconverter (BUC), a low noise block downconverter (LNB), and diplexer or integrated RC converter, a modem or the like.

Rotatable support legs provide a variable positioning capability of a communication terminal, in an embodiment. Certain features of various embodiments are described herein with reference to support legs which are variously rotatable each about a respective first axis and further rotatable each about a respective second axis. Unless otherwise indicated, "first rotational axis" (or, for brevity, "first axis") refers to an axis which is fixed—i.e., unvarying—relative to a housing of the communication terminal. "Second rotational axis" (or "second axis") refers herein to an axis of rotation by a support leg, wherein such axis varies with rotation by that support leg about its respective first axis. With respect to a given support leg, "first axis rotation" (or, for brevity, "first rotation") refers herein to a rotation by that support leg about its respective first axis. Similarly, "second axis rotation" (or "second rotation") refers to rotation by the given support leg about its respective second axis.

In existing solutions for electronically steerable antenna systems, a communication terminal is designed for only a very particular type of application. These designs do not take into consideration whether or how a communication terminal might be made moveable and/or otherwise reconfigurable between very different use cases. For example, these designs do not readily provide for coupling of a communication terminal to any of various different types of vehicles, buildings and/or other structures.

In the following description, numerous details are set forth to provide a more thorough explanation of the present invention. It will be apparent, however, to one skilled in the art, that the present invention may be practiced without these specific details. In other instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

FIG. 1 shows features of a system 100 to participate in wireless communication according to an embodiment. System 100 is one example of an embodiment configured to function as a communication terminal, wherein an electronically steerable antenna, disposed in a housing, is to participate in a communication of signals which propagate through the housing. Support legs may be variously coupled to the housing, directly or indirectly, where support leg are variously rotatable to facilitate positioning (e.g., repositioning) of the antenna and housing. In some embodiments, the support legs include or couple to hardware which further facilitates coupling of system 100 into or onto a vehicle, building or other structure.

In the example embodiment shown, system 100 includes a housing 110 and an electronically steerable antenna disposed therein. The electronically steerable antenna (represented by the illustrative antenna panel 112 shown) may facilitate a communication of signals through housing 110. Housing 110 may comprise any of a variety of plastic, metal and/or other materials which form at least in part a chassis or other such structure to provide protection (e.g., environmental and/or mechanical) to antenna panel 112. In some embodiments, some or all of housing 110 is to function as a radome for antenna panel 112—e.g., wherein an upper side of housing 110 comprises one or more dielectric materials which are transparent to, or otherwise transmissive of, radio frequency (RF) signals that are to be communicated using antenna panel 112.

To facilitate positioning of antenna panel 112, system 100 may further comprise a plurality of support legs which are each hingedly coupled directly or indirectly to housing 110. By way of illustration and not limitation, system 100 may include support legs 130a, 130b, 130c, 130d each coupled via a mount or other support structure (such as the illustrative frame 120 shown). The particular number and arrangement shown for support legs 130a, 130b, 130c, 130d is merely illustrative, and system 100 may include more, fewer and/or differently configured support legs, in other embodiments.

A support leg (or, for brevity, simply "leg") may contribute to the suspension of housing 110 and antenna panel 112 over some surface. After positioning of system 100, support legs 130a-130d may contribute to the constraining of at least some movement of housing 110 and antenna panel 112. Support legs 130a-130d may comprise any of a variety of plastic, metal and/or other materials that are extruded, welded, molded, cast, machined and/or otherwise processed to form structures that support the weight of housing 110 and components disposed therein. Such materials—e.g., including, but not limited to, aluminum, carbon fiber, any of various polymers (e.g., polyvinyl chloride, polypropylene or the like), etc.—may be adapted from conventional designs for providing load-bearing stands, frames and/or other such support structures.

Some or all support legs of system 100—e.g., including each of support legs 130a-130d—may each be rotatable about a respective first axis. By way of illustration and not limitation, support legs 130a, 130c may each be rotatable about a common axis 132a and/or support legs 130b, 130d may each be rotatable about a common axis 132b (e.g., where axes 132a, 132b each extend in parallel with the x-y plane shown in the bottom elevation view 101 of system 100). In another embodiment, support legs 130a, 130c (or support legs 130a, 130c) are rotatable about different respective axes which are in parallel with the x-y plane of the xyz coordinate system shown.

In one example embodiment, one or both of support legs 130a, 130c are disposed, at least in part, in or on a body 140a (e.g., a plate, housing or other anchoring structure) which articulates, via a hinge 142a, relative to another body 144a that is coupled to—or in some embodiments, integrated with—support structure 120. Alternatively or in addition, one or both of support legs 130b, 130d may be similarly disposed, at least in part, in or on a body 140b which is to articulate, via a hinge 142b, relative to a body 144b.

Although some embodiments are not limited in this regard, system 100 may include at least two pairs of support legs (e.g., including leg pair 130a, 130c and leg pair 130b, 130d), where each such pair of support legs are rotatable about a respective same first axis. For example, first axis rotation of one of support arms 130a, 130c may result in an articulation of body 140a that, in turn, causes first axis rotation of the other one of support arms 130a, 130c. Similarly, first axis rotation of one of support arms 130b, 130d may result in an articulation of body 140b that, in turn, causes first axis rotation of the other one of support arms 130b, 130d.

Some or all such support legs may each be further rotatable about a respective second axis—e.g., wherein each such respective second axis is variable with rotation of the corresponding support leg about its respective first axis. By way of illustration and not limitation, support legs 130a, 130b, 130c, 130d may be variously rotatable about axes 134a, 134b, 134c, 134d, respectively. In such an embodiment, rotation of support leg 130a about axis 132a may cause a change in orientation of axis 134a—e.g., where rotation of support leg 130c about axis 132a may cause a change in orientation of axis 134c. Alternatively or in addition, rotation of support leg 130b about axis 132b may cause a change in orientation of axis 134b—e.g., where rotation of support leg 130d about axis 132b may cause a change in orientation of axis 134d.

In some embodiments, system 100 is configured to provide a respective second axis rotation of one support leg in response to a respective second axis rotation of a different support leg. For example, body 140a may include or couple to hardware, not shown, to induce rotation of support leg 130c about axis 134c in response to rotation of support leg 130a about axis 134a (or vice versa). Alternatively or in addition, body 140b may similarly include or couple to hardware, not shown, to induce rotation of support leg 130d about axis 134b in response to rotation of support leg 130b about axis 134b (or vice versa).

Although some embodiments are not limited in this regard, system 100 may further comprise one or more lock devices (not shown) to selectively enable or disable first axis rotation of a support leg and/or to selectively enable or disable second axis rotation of that support leg. Such a lock device may, for example, have a default state that prevents at least some rotation when the lock device is not being actively operated (e.g., pressed, held, touched, or the like) by a user. In some embodiments, one type of rotation by a given support leg is enabled/allowed only while another type of rotation by that same support leg is disabled/prevented.

Figure 2:
FIG. 2 is a flow diagram illustrating elements of a method of operating a communication terminal according to an embodiment.
Figure 2:
Figure 2:

FIG. 2 shows features of a method to operate a communication terminal according to an embodiment. Method 200 is one example of operations that, for example, enable operation of system 100 while is it mounted on (and in some embodiments, coupled to or integrated with) a vehicle or other structure.

As shown in FIG. 2, method 200 may include, at 210, communicating signals through a housing with an electronically steerable antenna which is disposed in the housing. The communicating at 210 may, for example, include operating antenna panel 112 to transmit first signals through a radome portion of housing 110 and/or to receive second signals via such a radome portion.

In such an embodiment, method 200 may further comprise operations to position the housing and the electronically steerable antenna, where such positioning is performed using a plurality of support legs (e.g., including support legs 130a-130d) that are each hingedly coupled to the housing. For example, such operations may include, at 220, rotating the support legs each about a respective first axis which is fixed relative to the housing. Alternatively or in addition such operations may include, at 230, rotating the support legs each about a respective second axis (where the respective second axis is variable with rotation of the corresponding support leg about its respective first axis). Some or all of the various rotating at 220 and 230 may take place before the communicating at 210, for example.

In one embodiment, the plurality of support legs include a first support leg and a second support leg—e.g., support legs 130a, 130c, respectively—wherein the rotating at 220 includes providing a respective first axis rotation of the second support leg which is in response to a respective first axis rotation of the first support leg. Alternatively or in addition, the rotating at 230 may include providing a respective second axis rotation of the second support leg which is in response to a respective second axis rotation of the first support leg. For example, the two support legs may be mechanically coupled to one another with respect to their respective first axis rotations and/or with respect to their respective second axis rotations. In one such embodiment, some or all such coupling may be selectively engaged and/or disengaged.

Although some embodiments are not limited in this regard, method 200 may further comprise operations (not shown) to selectively enable or disable—e.g., to unlock or lock—the respective first axis rotation and/or second axis rotation of one or more support legs. For example, method 200 may further comprise operating an actuator to engage or disengage a latch, rod, gear or other mechanism which is to selectively constrain support leg rotation. For a given support leg (e.g., for each of the plurality of support legs), the respective first axis rotation of the support leg may, for example, be enabled only while a respective second axis rotation of the support leg is disabled. Alternatively or in addition, the respective second axis rotation of the support leg may be enabled only while the respective first axis rotation of the support leg is disabled.

Disabling (or enabling) a respective first axis rotation of a first support arm may result in, or otherwise include, disabling (enabling) a respective first axis rotation of a second support arm. Alternatively or in addition, disabling (or enabling) a respective second axis rotation of the first support arm may result in or otherwise include disabling (enabling) a respective second axis rotation of the second support arm. In some embodiments, the enabling or disabling of a rotation (e.g., first axis rotation or second axis rotation) by a given support leg is in response to operation of an actuator which moves with such rotation. For example, the actuator may be coupled to (e.g., disposed in or on) the support leg, wherein the actuator moves with the respective first axis rotation of the support leg, and further moves with the respective second axis rotation of the support leg.

Figure 3A:
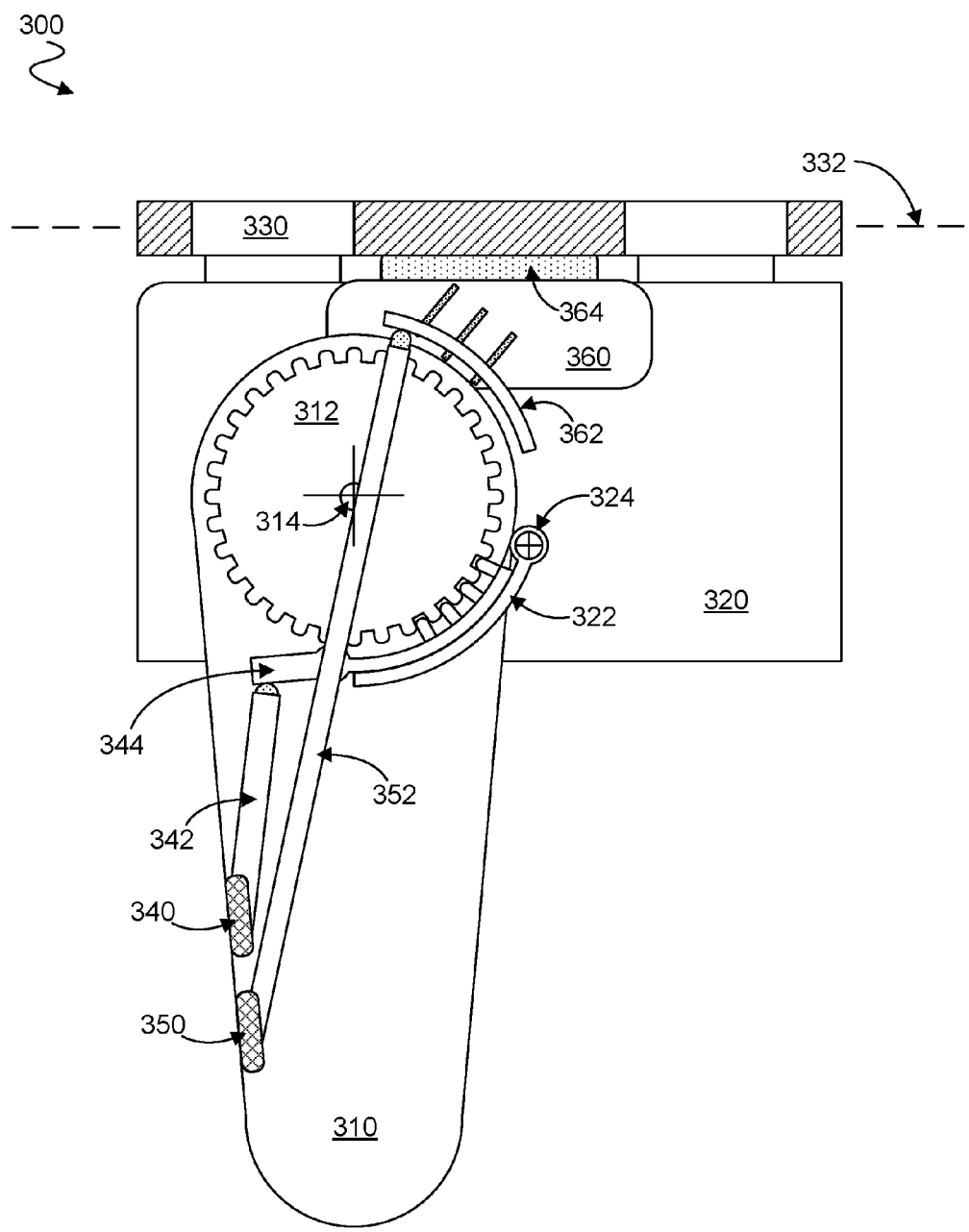
FIGS. 3A-3D show respective elevation views each of a respective device to position and support an electronically steerable antenna according to a corresponding embodiment.

FIG. 3A shows features of an apparatus 300 to function as a communication terminal according to an embodiment. Apparatus 300 is one example of an embodiment that provides for at least two axes of rotation by a support leg, where the support leg is one of multiple such support legs coupled to enable positioning of an electronically steerable antenna. In an embodiment, apparatus 300 includes some or all of the features of system 100—e.g., where positioning with apparatus 300 includes some or all of the rotating at 220 or the rotating at 230 of method 200.

As shown in FIG. 3A, apparatus 300 may include a baseplate, housing or other structure (represented as the illustrative base 320) and a hinge 330 coupled thereto—e.g., where base 320 and a hinge 330 correspond functionally to body 140a and hinge 142a, respectively. Apparatus 300 may further comprise a leg 310 (e.g., one of support legs 130a, 130c), where the structure represented by base 320 is to partially constrain leg 310 at or near one end thereof. Hinge 330 may support a first rotation of base 320, and the leg 310 coupled thereto, about an axis 332. Base 320 may allow a second rotation of leg 310 about another axis—e.g., the illustrative axis 314 shown—which changes in orientation with rotation of leg 310 about axis 332.

Although some embodiments are not limited in this regard, apparatus 300 may include one or more locks which are operable to selectively enable or disable a first rotation of leg 310 (about axis 332) and/or to selectively enable or disable a second rotation of leg 310 (about axis 314). Such one or more locks may be disposed in or on (and in some embodiments, rotate with) leg 310 and/or the housing or other structure which is represented by base 320.

By way of illustration and not limitation, apparatus 300 may comprise a lock 360 to selectively enable or disable first axis rotation of leg 310. Lock 360 may be configured to selectively extend or retract one or more pins, rods and/or other structures (such as the illustrative plate 364 shown) to variously engage with, or disengage from, hinge 330, thereby preventing or enabling rotation with hinge 330 about axis 332. For example, the one or more structures represented by plate 364 may be selectively extended or retracted in response to movement of a pressure plate 362 of lock 360.

In the example embodiment shown, pressure plate 362 may be moved in response to an actuator 352 that, for example, is activated with a switch, latch or other trigger mechanism (such as the illustrative button 350 shown) that is operable by a user. The trigger mechanism represented by button 350 may, for example, be disposed in or on leg 310—e.g., wherein the trigger is located away from axis 314 by a distance that is at least 15% (e.g., at least 20% and, in some embodiments, at least 30%) of the distance between axis 314 and a distal end of the leg 310. In such an embodiment, the trigger mechanism may move with leg 310.

Alternatively or in addition, apparatus 300 may include a lock to selectively enable or disable second axis rotation of leg 310. For example, the housing or other structure represented by base 320 may have disposed therein or thereon a spring loaded mount 324 and an engagement arm 322 which is flexibly coupled to base 320 via spring loaded mount 324. A lever 344 may be configured to move engagement arm 322 on spring loaded mount 324, thereby selectively preventing or enabling rotation of leg 310 about axis 314. In such an embodiment, engagement arm 322 may include or couple to teeth structures that can be engaged with, or disengaged from, a gear 312 which is disposed on or otherwise coupled to leg 310.

In the example embodiment shown, movement of lever 344 is in response to an actuator 342 that, for example, is activated with a trigger mechanism (such as the illustrative button 340 shown) that is operable by a user. The trigger mechanism represented by button 340 may, for example, be disposed in or on leg 310—e.g., wherein the trigger is located away from axis 314 by a distance that is at least 15% (e.g., at least 20% and, in some embodiments, at least 30%) of the distance between axis 314 and a distal end of the leg 310. In such an embodiment, the trigger mechanism may move with leg 310.

Figure 3B:
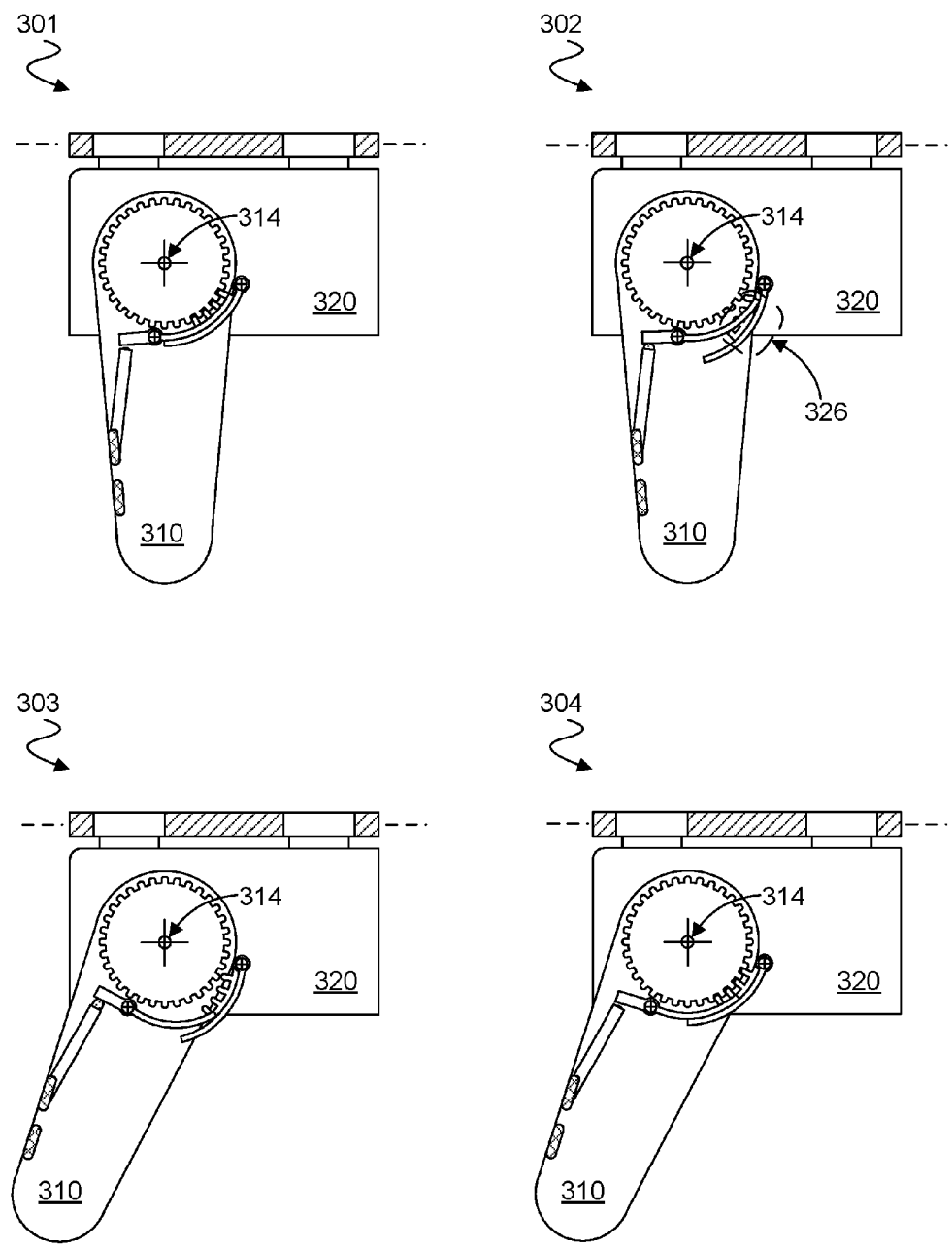

FIG. 3B illustrates a sequence of states 301 through 304 of apparatus 300 for selectively providing or preventing second axis rotation (in this example embodiment, rotation about axis 314) of support leg 310. To avoid obscuring certain features of various embodiments, states 301 through 304 do not show certain structures of apparatus 300 which are to selectively enable or disable first axis rotation of leg 310.

At state 301, any force applied by lever 344 onto engagement arm 322 is insufficient to overcome a pressure which is applied by spring-loaded mount 324. As a result, engagement arm 322 is engaged with gear 312 by default, resulting in the rotation of leg 310 about axis 314 being disabled by default. At state 302, actuator 342 has been operated by a user to deflect engagement arm 322 using lever 344. As a result of this deflection, teeth structures of engagement arm 322 (in the region 326 shown) are disengaged from gear 312, allowing rotation of gear 312 and leg 310 about axis 314.

At state 303, the teeth structures of engagement arm 322 remain disengaged from gear 312, and leg 310 has been rotated about axis 314 by the user. At state 304, actuator 342 has been operated by a user to remove or otherwise decrease the pressure applied to engagement arm 322 by lever 344. As a result, the teeth structures of engagement arm 322 are reengaged with gear 312 thereby securing the angle of rotation of arm 310 which was configured at state 303.

Figure 3C:
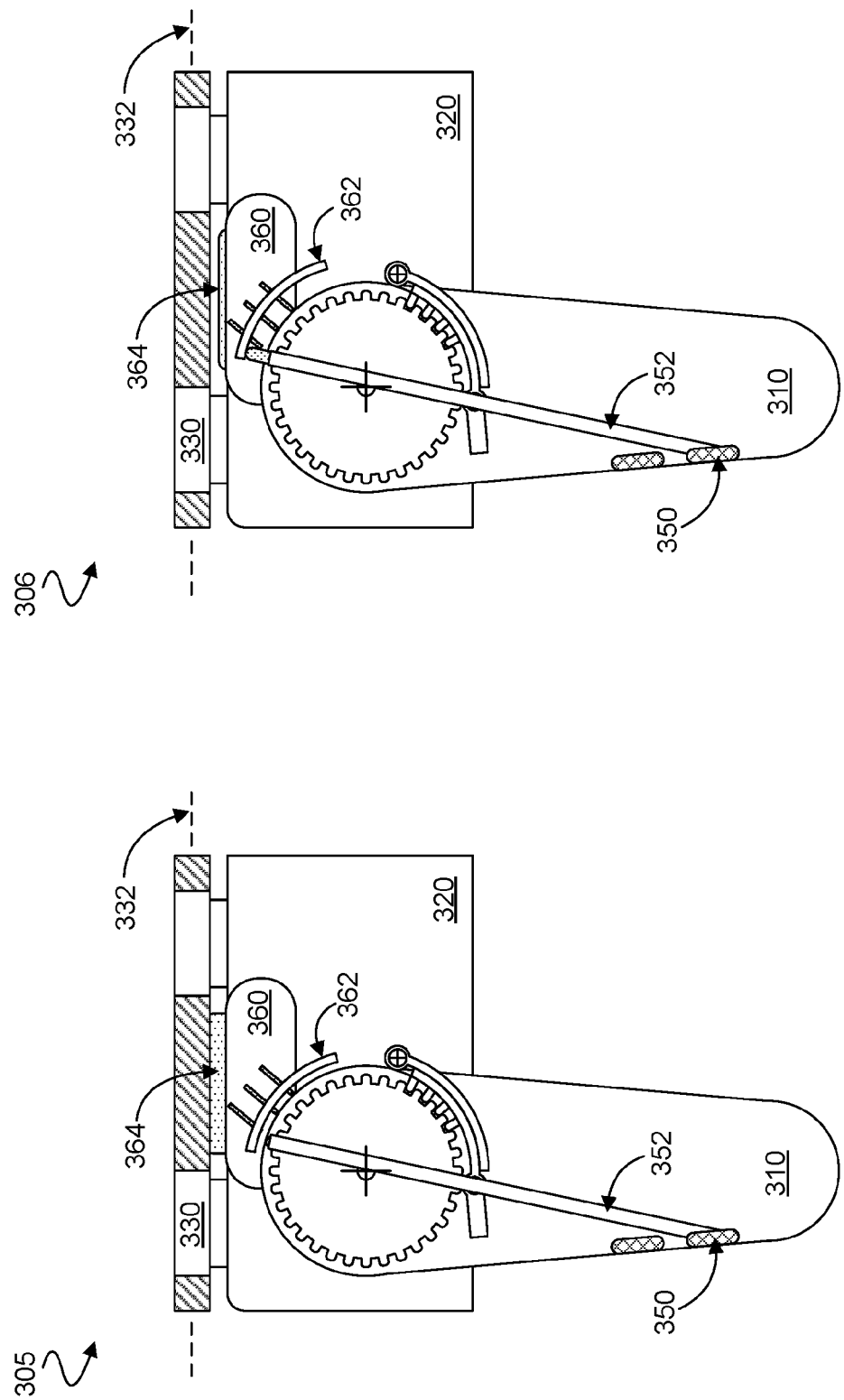

FIG. 3C illustrates a sequence of states 305 and 306 of apparatus 300 for selectively providing or preventing first axis rotation (in this example embodiment, rotation about axis 332) of support leg 310. To avoid obscuring certain features of various embodiments, states 305 and 306 do not show certain structures of apparatus 300 which are to selectively enable or disable second axis rotation of leg 310.

At state 305, any force applied by actuator 352 is insufficient to move pressure plate 362 from a default state. In this particular example, the default state of lock 360 corresponds to plate 364 (or other such structure) applying pressure to otherwise engaging with hinge 330. As a result, rotation of leg 310 about axis 332 being disabled by default. At state 306, actuator 352 has been operated by a user—e.g., using a trigger mechanism such as button 350—to deflect pressure plate 362. As a result of this deflection, lock 360 retracts plate 364 from hinge 330, thereby allowing rotation of leg 310 about axis 332.

Figure 3D:
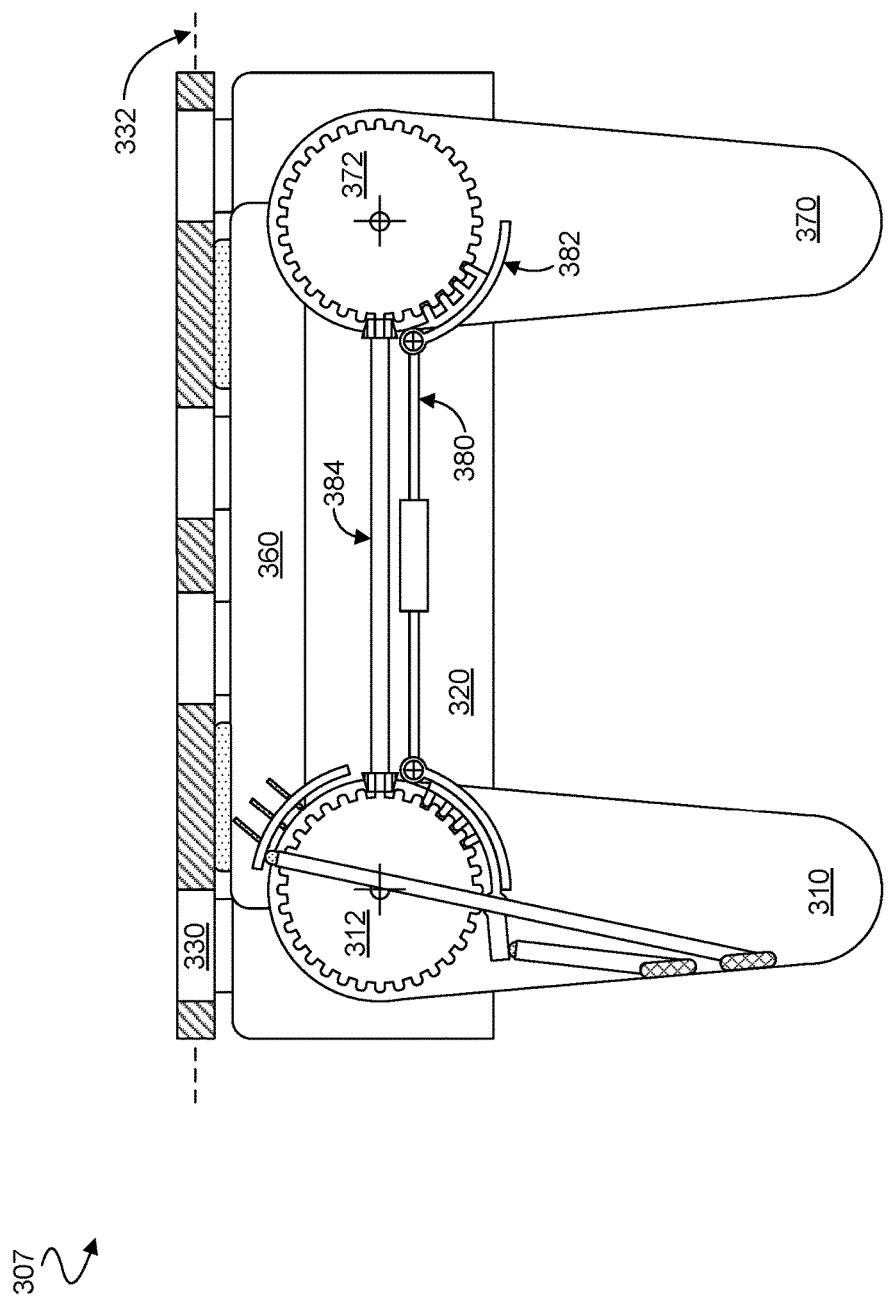

FIG. 3D shows features of an apparatus 307 to function as a communication terminal according to another embodiment. Apparatus 307 may include some or all of the features of system 100—e.g., where positioning with apparatus 307 includes some or all of the rotating at 220 or the rotating at 230 of method 200. Apparatus 300 is one example of an embodiment wherein two support legs are mechanically coupled with one another with respect to their respective first axis rotations and/or with respect to their respective second axis rotations. For brevity, apparatus 300 is shown herein as including features of apparatus 300. However, other embodiments are not limited in this regard.

In the example embodiment shown, apparatus 307 includes base 320, hinge 330 and support leg 310, wherein apparatus 307 facilitates both first axis rotation and second axis rotation by support leg 310 (e.g., about axis 332 and about axis 314, respectively). As with apparatus 300, apparatus 307 may further include locks to selectively enable or disable said first axis rotation and/or second axis rotation of support leg 310.

Apparatus 307 may further comprise another support leg 370 which is mechanically coupled with support leg 310—e.g., to enable a respective first axis rotation of one of support legs 310, 370 which is in response to in a respective first axis rotation of the other one of support legs 310, 370. For example, base 320 may transfer at least part of a first axis rotation force from one of support legs 310, 370 to the other of support legs 310, 370. In such an embodiment, lock 360 may operate to selectively enable or disable first axis rotation of both support legs 310, 370 together.

Alternatively or in addition support legs 310, 370 may be mechanically coupled to enable a respective second axis rotation of one of support legs 310, 370 which is in response to in a respective second axis rotation of the other one of support legs 310, 370. For example, a geared shaft 384 of apparatus 370 may operate to transfer a rotational force between gear 312 and another gear 372 which is disposed on or otherwise coupled to leg 370.

In such an embodiment, apparatus 307 may be configurable to selectively enable or disable second axis rotations of support legs 310, 370 together. For example, apparatus 370 may further comprise an engagement arm 382 that is to be selectively engaged with (or disengaged from) gear 372. Deflection of engagement arm 382 may be actuated with a tensioner 380 that transfers force from a mechanism (e.g., spring-loaded mount 324) that is to selectively prevent second axis rotation of leg 310.

Figure 4A:
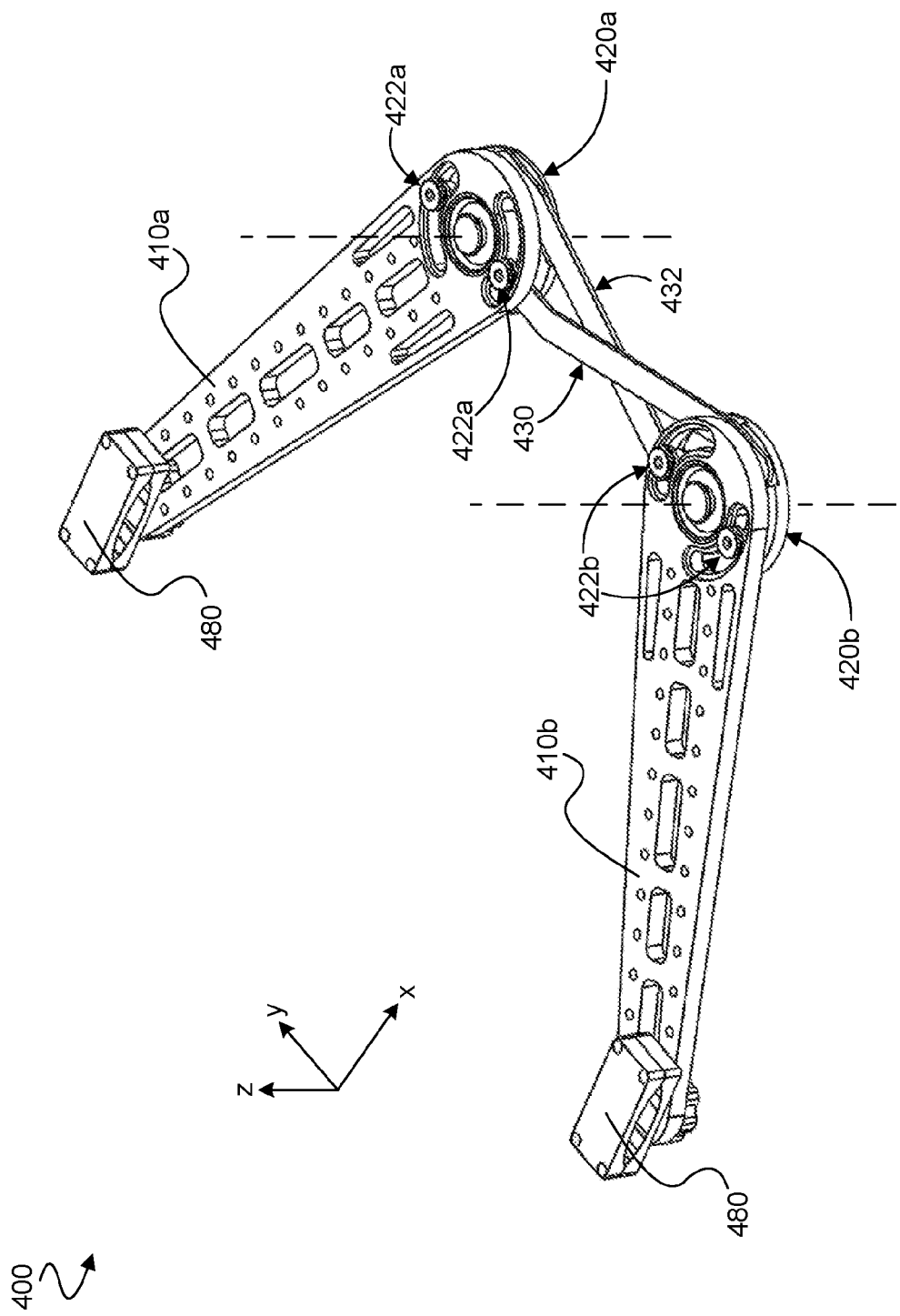
FIGS. 4A-4C show various perspective views of a device to position and support an electronically steerable antenna according to an embodiment.
Figure 4B:
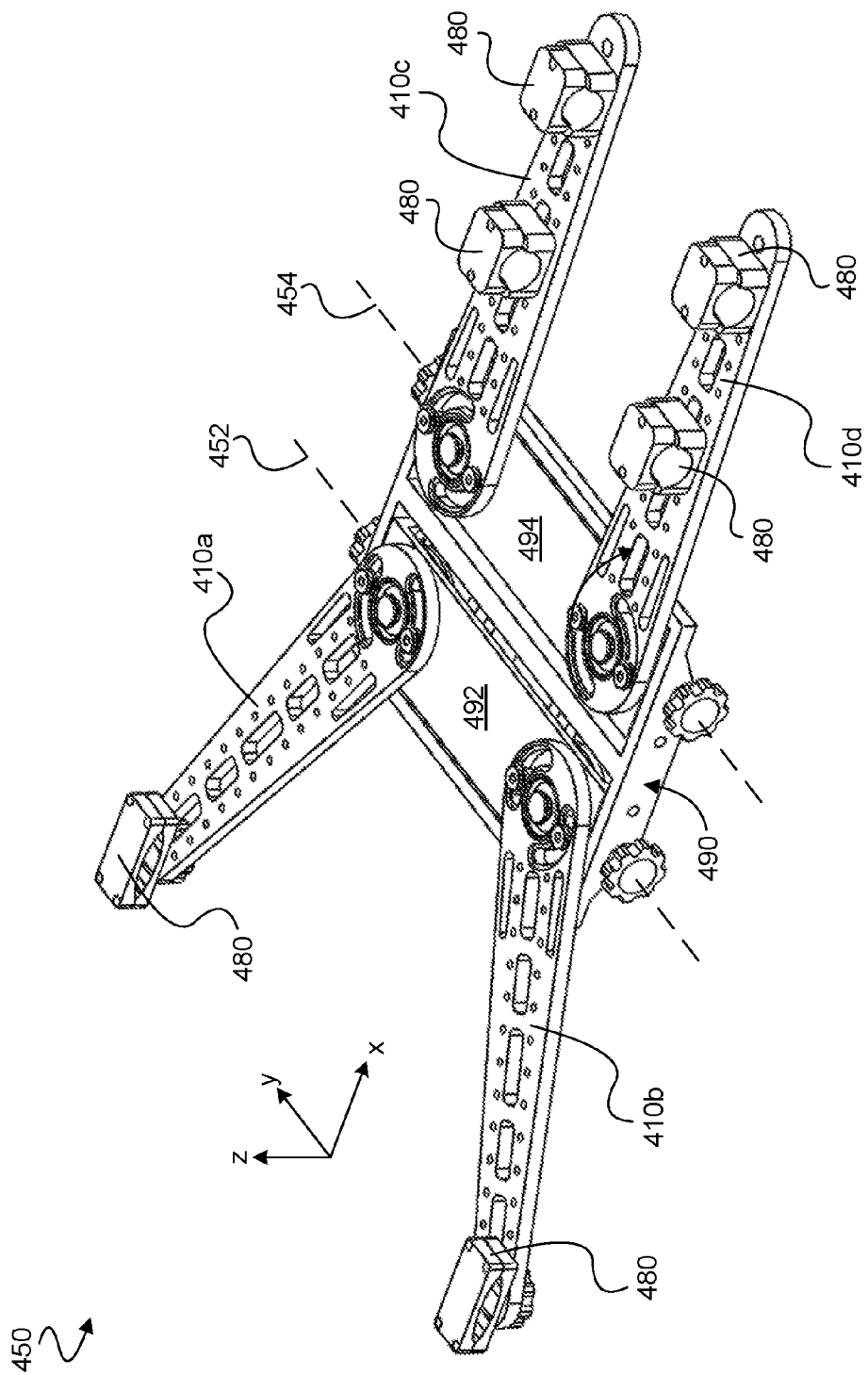
Figure 4C:
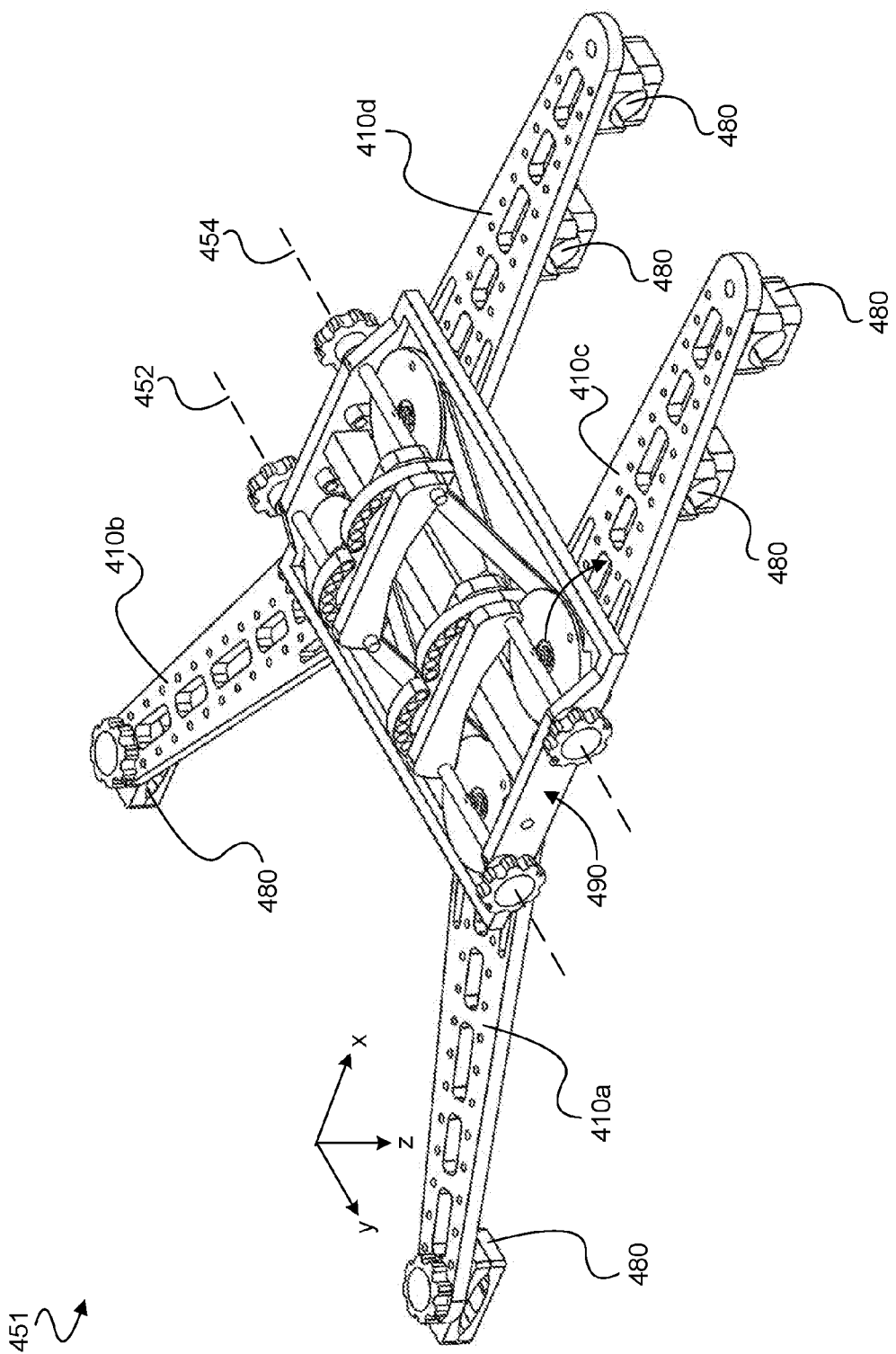

FIGS. 4A-4C variously shows features of a device which is to position an electronically steerable antenna according to an embodiment. More particularly, FIG. 4A shows (with reference to an xyz coordinate system) a pair 400 of mechanically coupled support legs of the device, and FIGS. 4B, 4C show respective bottom and top perspective views of the device.

The device shown in FIGS. 4A-4C may include features of system 100, apparatus 300 and/or apparatus 307—e.g., where positioning with the device includes some or all of the rotating at 220 or the rotating at 230 of method 200. In an embodiment, the device includes or is to couple to a housing (e.g., housing 110, not shown) having disposed therein an array of RF elements such as those of antenna panel 112.

To facilitate positioning of such a housing and array of RF elements, the device may comprise support legs 410a, 410b, 410c, 410d which are each hingedly coupled to a support structure, such as the illustrative frame 490 shown. The particular number and arrangement shown for support legs 410a, 410b, 410c, 410d is merely illustrative, and the device may include more, fewer and/or differently configured support legs, in other embodiments.

As variously shown in FIGS. 4B, 4C, a pair of support legs may be mechanically coupled with one another with respect to first axis rotation. For example, support legs 410a, 410b may each be coupled to rotate with a mount plate 492 about a same first axis 452 (parallel to the x-y plane shown). Similarly, support legs 410c, 410d may each be coupled to rotate with another mount plate 494 about another first axis 454 (parallel to the x-y plane shown).

Alternatively or in addition, a pair of support legs may be mechanically coupled with one another with respect to second axis rotation. By way of illustration and not limitation, support legs 410a, 410b may be configured to rotate around respective hubs 420a, 420b that are each coupled to mount plate 492. In such an embodiment, guide pins 422a may extend from hub 420a, into grooves formed by support leg 410a, to aid rotation of support leg 410a about a respective z-dimension axis. Similarly, guide pins 422b may extend from hub 420b, into grooves formed by support leg 410b, to aid rotation of support leg 410b about a respective z-dimension axis. In such an embodiment, coupling members (such as the illustrative ties 430, 432 shown) may translate rotational force from one of support leg 410a, 410b to the other one of support leg 410a, 410b. As a result, rotation of support leg 410a on hub 420a may result in rotation of support leg 410b on hub 420b (and/or vice versa).

Although some embodiments are not limited in this regard, one or more support legs may each include or accommodate coupling with one or more adjustable clamp structure—such as the illustrative clamps 480 shown—which enable attachment of the device (along with the housing and antenna, not shown) to a vehicle, building or other structure.

Some embodiments variously provide an antenna architecture that feeds the antenna from a central point with an excitation (feed wave) that spreads in a cylindrical or concentric manner outward from the feed point. The antenna works by arranging multiple cylindrically fed subaperture antennas (e.g., patch antennas) with the feed wave. In an alternative embodiment, the antenna is fed from the perimeter inward, rather than from the center outward. This can be helpful because it counteracts the amplitude excitation decay caused by scattering energy from the aperture. Scattering occurs similarly in both orientations, but the natural taper caused by focusing of the energy in the feed wave as it travels from the perimeter inward counteracts the decreasing taper caused by the intended scattering. Note that the following discusses the use of LC elements. However, these may be replaced with the MEMs elements.

Embodiments of the invention include a holographic antenna based on doubling the density typically required to achieve holography and filling the aperture with two types of orthogonal sets of elements. In one embodiment, one set of elements is linearly oriented at +45 degrees relative to the feed wave, and the second set of elements is oriented at −45 degrees relative to the feed wave. Both types are illuminated by the same feed wave, which, in one form, is a parallel plate mode launched by a coaxial pin feed.

In some embodiments, an antenna system of the communication terminal is a component or subsystem of a satellite earth station (ES) operating on a mobile platform (e.g., aeronautical, maritime, land, etc.) that operates using either Ka-band frequencies or Ku-band frequencies for civil commercial satellite communications. Note that embodiments of the antenna system also can be used in earth stations that are not on mobile platforms (e.g., fixed or transportable earth stations).

In one embodiment, the antenna system uses surface scattering metamaterial technology to form and steer transmit and receive beams through separate antennas. In one embodiment, the antenna systems are analog systems, in contrast to antenna systems that employ digital signal processing to electrically form and steer beams (such as phased array antennas).

In one embodiment, the antenna system is comprised of three functional subsystems: (1) a wave propagating structure consisting of a cylindrical wave feed architecture; (2) an array of wave scattering metamaterial unit cells; and (3) a control structure to command formation of an adjustable radiation field (beam) from the metamaterial scattering elements using holographic principles.

Figure 5:
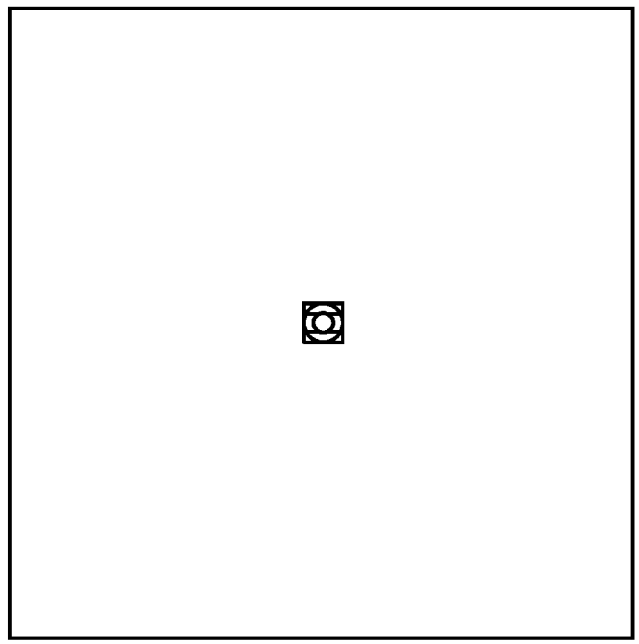
FIG. 5 illustrates a top view of one embodiment of a coaxial feed that is used to provide a cylindrical wave feed.

FIG. 5 illustrates a top view of one embodiment of a coaxial feed (e.g., included in or to operate with antenna panel 112) that is used to provide a cylindrical wave feed. Referring to FIG. 5, the coaxial feed includes a center conductor and an outer conductor. In one embodiment, the cylindrical wave feed architecture feeds the antenna from a central point with an excitation that spreads outward in a cylindrical manner from the feed point. That is, a cylindrically fed antenna creates an outward travelling concentric feed wave. Even so, the shape of the cylindrical feed antenna around the cylindrical feed can be circular, square or any shape. In another embodiment, a cylindrically fed antenna creates an inward travelling feed wave. In such a case, the feed wave most naturally comes from a circular structure.

Figure 7A:
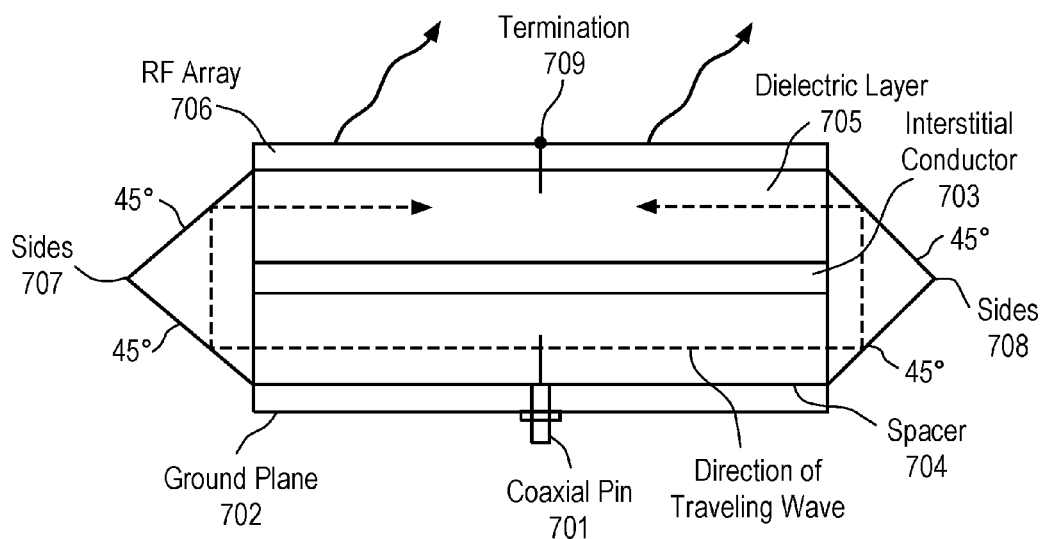
FIGS. 7A and 7B illustrate side views of embodiments of a cylindrically fed antenna structure.

FIG. 7A illustrates a side view of one embodiment of a cylindrically fed antenna structure. The antenna produces an inwardly travelling wave using a double layer feed structure (i.e., two layers of a feed structure). In one embodiment, the antenna includes a circular outer shape, though this is not required. That is, non-circular inward travelling structures can be used. In one embodiment, the antenna structure in FIG. 7A includes the coaxial feed of FIG. 5.

Referring to FIG. 7A, a coaxial pin 701 is used to excite the field on the lower level of the antenna. In one embodiment, coaxial pin 701 is a 50Ω coax pin that is readily available. Coaxial pin 701 is coupled (e.g., bolted) to the bottom of the antenna structure, which is conducting ground plane 702.

Separate from conducting ground plane 702 is interstitial conductor 703, which is an internal conductor. In one embodiment, conducting ground plane 702 and interstitial conductor 703 are parallel to each other. In one embodiment, the distance between ground plane 702 and interstitial conductor 703 is 0.1-0.15". In another embodiment, this distance may be λ/2, where λ is the wavelength of the travelling wave at the frequency of operation.

Ground plane 702 is separated from interstitial conductor 703 via a spacer 704. In one embodiment, spacer 704 is a foam or air-like spacer. In one embodiment, spacer 704 comprises a plastic spacer.

Figure 6:
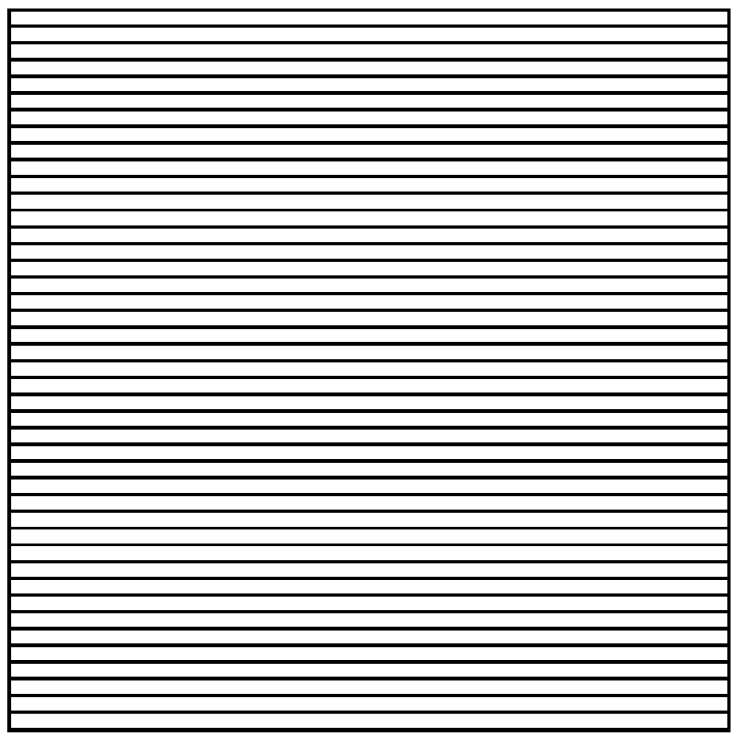
FIG. 6 illustrates an example of a dielectric material into which a feed wave is launched.

On top of interstitial conductor 703 is dielectric layer 705. In one embodiment, dielectric layer 705 is plastic. FIG. 6 illustrates an example of a dielectric material into which a feed wave is launched. The purpose of dielectric layer 705 is to slow the travelling wave relative to free space velocity. In one embodiment, dielectric layer 705 slows the travelling wave by 30% relative to free space. In one embodiment, the range of indices of refraction that are suitable for beam forming are 1.2-1.8, where free space has by definition an index of refraction equal to 1. Other dielectric spacer materials, such as, for example, plastic, may be used to achieve this effect. Note that materials other than plastic may be used as long as they achieve the desired wave slowing effect. Alternatively, a material with distributed structures may be used as dielectric 705, such as periodic sub-wavelength metallic structures that can be machined or lithographically defined, for example.

An RF-array 706 is on top of dielectric 705. In one embodiment, the distance between interstitial conductor 703 and RF-array 706 is 0.1-0.15". In another embodiment, this distance may be λ_eff/2, where λ_eff is the effective wavelength in the medium at the design frequency.

Figure 24:
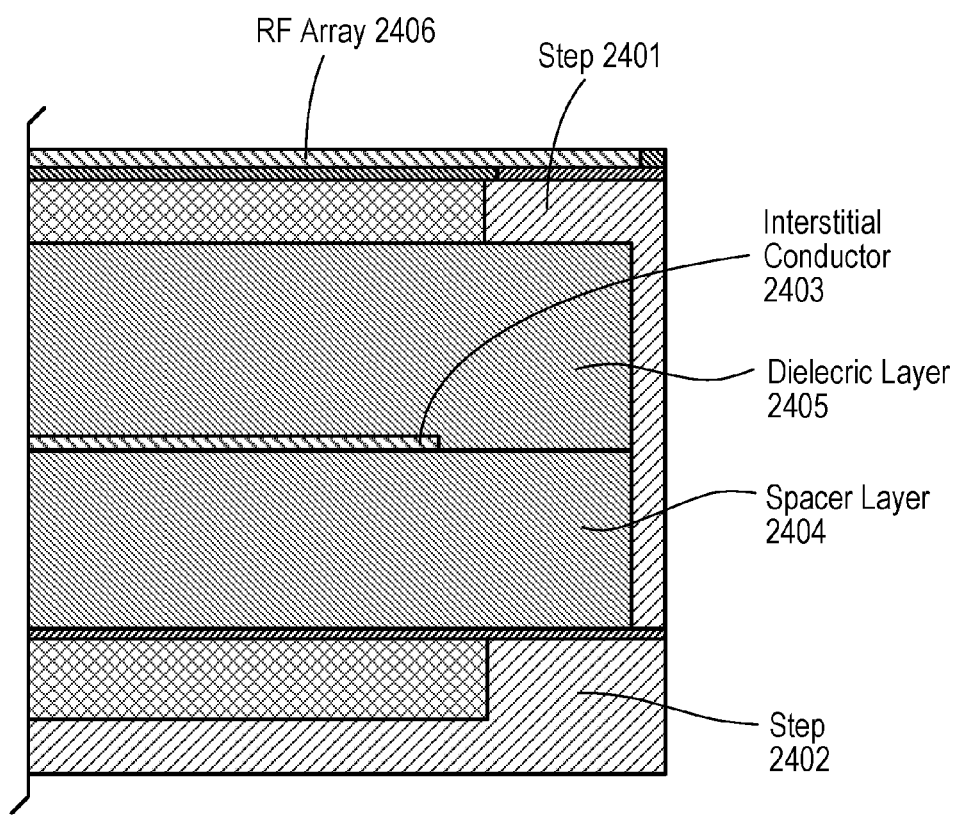
FIG. 24 illustrates an alternative antenna embodiment in which each of the sides include a step to cause a traveling wave to be transmitted from a bottom layer to a top layer.

The antenna includes sides 707 and 708. Sides 707 and 708 are angled to cause a travelling wave feed from coax pin 701 to be propagated from the area below interstitial conductor 703 (the spacer layer) to the area above interstitial conductor 703 (the dielectric layer) via reflection. In one embodiment, the angle of sides 707 and 708 are at 45° angles. In an alternative embodiment, sides 707 and 708 could be replaced with a continuous radius to achieve the reflection. While FIG. 7A shows angled sides that have angle of 45 degrees, other angles that accomplish signal transmission from lower level feed to upper level feed may be used. That is, given that the effective wavelength in the lower feed will generally be different than in the upper feed, some deviation from the ideal 45° angles could be used to aid transmission from the lower to the upper feed level. For example, in another embodiment, the 45° angles are replaced with a single step such as shown in FIG. 24. Referring to FIG. 24, steps 2401 and 2402 are shown under an RF array 2406 on one end of the antenna around dielectric layer 2405, interstitial conductor 2403, and spacer layer 2404. The same two steps are at the other ends of these layers.

In operation, when a feed wave is fed in from coaxial pin 701, the wave travels outward concentrically oriented from coaxial pin 701 in the area between ground plane 702 and interstitial conductor 703. The concentrically outgoing waves are reflected by sides 707 and 708 and travel inwardly in the area between interstitial conductor 703 and RF array 706. The reflection from the edge of the circular perimeter causes the wave to remain in phase (i.e., it is an in-phase reflection). The travelling wave is slowed by dielectric layer 705. At this point, the travelling wave starts interacting and exciting with elements in RF array 706 to obtain the desired scattering.

To terminate the travelling wave, a termination 709 is included in the antenna at the geometric center of the antenna. In one embodiment, termination 709 comprises a pin termination (e.g., a 50Ω pin). In another embodiment, termination 709 comprises an RF absorber that terminates unused energy to prevent reflections of that unused energy back through the feed structure of the antenna. These could be used at the top of RF array 706.

Figure 7B:
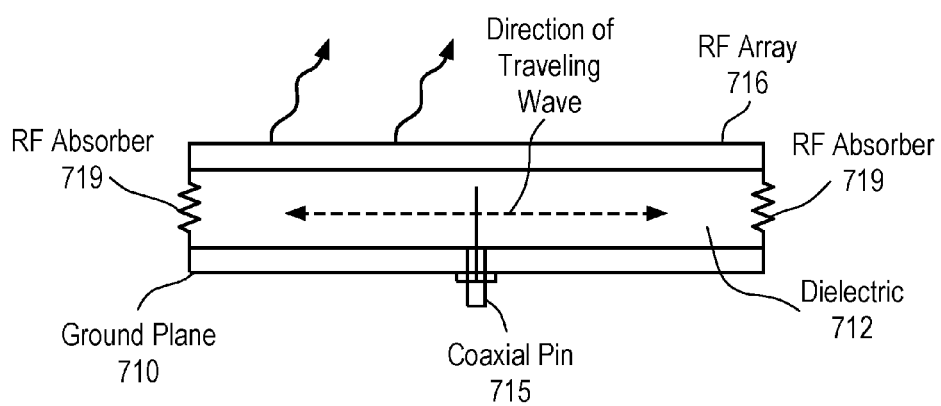

FIG. 7B illustrates another embodiment of the antenna system with an outgoing wave. Referring to FIG. 7B, a ground plane 710 may be substantially parallel to a dielectric layer 712 (e.g., a plastic layer, etc.). RF absorbers 719 (e.g., resistors) couple the ground plane 710 to a RF array 716 disposed on dielectric layer 712. A coaxial pin 715 (e.g., 50Ω) feeds the antenna.

In operation, a feed wave is fed through coaxial pin 715 and travels concentrically outward and interacts with the elements of RF array 716.

The cylindrical feed in both the antennas of FIGS. 7A and 7B improves the service angle of the antenna. Instead of a service angle of plus or minus forty five degrees azimuth (±45° Az) and plus or minus twenty five degrees elevation (±25° El), in one embodiment, the antenna system has a service angle of seventy five degrees (75°) from the bore sight in all directions. As with any beam forming antenna comprised of many individual radiators, the overall antenna gain is dependent on the gain of the constituent elements, which themselves are angle-dependent. When using common radiating elements, the overall antenna gain typically decreases as the beam is pointed further off bore sight. At 75 degrees off bore sight, significant gain degradation of about 6 dB is expected.

Embodiments of the antenna having a cylindrical feed solve one or more problems. These include dramatically simplifying the feed structure compared to antennas fed with a corporate divider network and therefore reducing total required antenna and antenna feed volume; decreasing sensitivity to manufacturing and control errors by maintaining high beam performance with coarser controls (extending all the way to simple binary control); giving a more advantageous side lobe pattern compared to rectilinear feeds because the cylindrically oriented feed waves result in spatially diverse side lobes in the far field; and allowing polarization to be dynamic, including allowing left-hand circular, right-hand circular, and linear polarizations, while not requiring a polarizer.

RF array 706 of FIG. 7A and RF array 716 of FIG. 7B include a wave scattering subsystem that includes a group of patch antennas (i.e., scatterers) that act as radiators. This group of patch antennas comprises an array of scattering metamaterial elements.

In one embodiment, each scattering element in the antenna system is part of a unit cell that consists of a lower conductor, a dielectric substrate and an upper conductor that embeds a complementary electric inductive-capacitive resonator ("complementary electric LC" or "CELC") that is etched in or deposited onto the upper conductor. As would be understood by those skilled in the art, LC in the context of CELC refers to inductance-capacitance, as opposed to liquid crystal.

In one embodiment, a liquid crystal (LC) is injected in the gap around the scattering element. Liquid crystal is encapsulated in each unit cell and separates the lower conductor associated with a slot from an upper conductor associated with its patch. Liquid crystal has a permittivity that is a function of the orientation of the molecules comprising the liquid crystal, and the orientation of the molecules (and thus the permittivity) can be controlled by adjusting the bias voltage across the liquid crystal. Using this property, the liquid crystal acts as an on/off switch for the transmission of energy from the guided wave to the CELC. When switched on, the CELC emits an electromagnetic wave like an electrically small dipole antenna.

Controlling the thickness of the LC increases the beam switching speed. A fifty percent (50%) reduction in the gap between the lower and the upper conductor (the thickness of the liquid crystal) results in a fourfold increase in speed. In another embodiment, the thickness of the liquid crystal results in a beam switching speed of approximately fourteen milliseconds (14 ms). In one embodiment, the LC is doped in a manner well-known in the art to improve responsiveness so that a seven millisecond (7 ms) requirement can be met.

The CELC element is responsive to a magnetic field that is applied parallel to the plane of the CELC element and perpendicular to the CELC gap complement. When a voltage is applied to the liquid crystal in the metamaterial scattering unit cell, the magnetic field component of the guided wave induces a magnetic excitation of the CELC, which, in turn, produces an electromagnetic wave in the same frequency as the guided wave.

The phase of the electromagnetic wave generated by a single CELC can be selected by the position of the CELC on the vector of the guided wave. Each cell generates a wave in phase with the guided wave parallel to the CELC. Because the CELCs are smaller than the wave length, the output wave has the same phase as the phase of the guided wave as it passes beneath the CELC.

In one embodiment, the cylindrical feed geometry of this antenna system allows the CELC elements to be positioned at forty five degree (45°) angles to the vector of the wave in the wave feed. This position of the elements enables control of the polarization of the free space wave generated from or received by the elements. In one embodiment, the CELCs are arranged with an inter-element spacing that is less than a free-space wavelength of the operating frequency of the antenna. For example, if there are four scattering elements per wavelength, the elements in the 30 GHz transmit antenna will be approximately 2.5 mm (i.e., ¼th the 10 mm free-space wavelength of 30 GHz).

In one embodiment, the CELCs are implemented with patch antennas that include a patch co-located over a slot with liquid crystal between the two. In this respect, the metamaterial antenna acts like a slotted (scattering) wave guide. With a slotted wave guide, the phase of the output wave depends on the location of the slot in relation to the guided wave.

Figure 8:
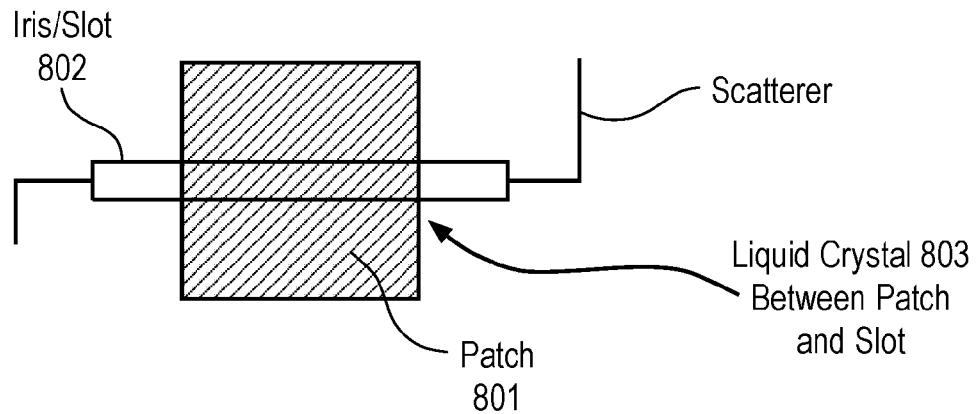
FIG. 8 illustrates a top view of one embodiment of one slot-coupled patch antenna, or scatterer.

FIG. 8 illustrates a top view of one embodiment of one patch antenna, or scattering element. Referring to FIG. 8, the patch antenna comprises a patch 801 collocated over a slot 802 with liquid crystal (LC) 803 in between patch 801 and slot 802.

Figure 9:
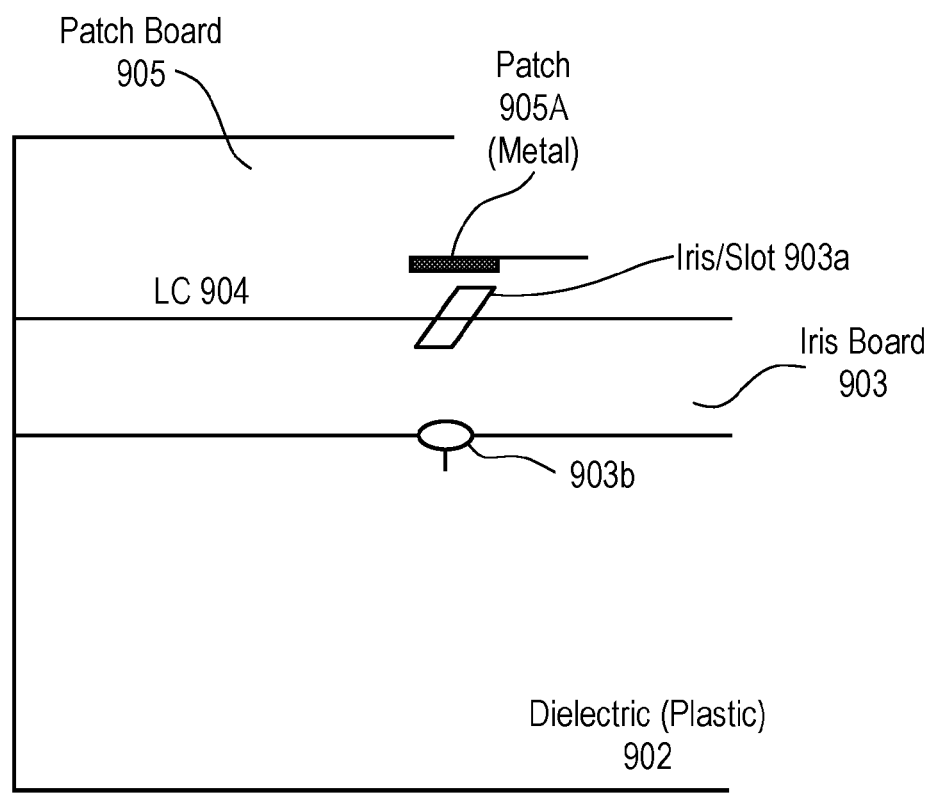
FIG. 9 illustrates a side view of a slot-fed patch antenna that is part of a cyclically fed antenna system.

FIG. 9 illustrates a side view of a patch antenna that is part of a cyclically fed antenna system. Referring to FIG. 9, the patch antenna is above dielectric 902 (e.g., a plastic insert, etc.) that is above the interstitial conductor 703 of FIG. 7A (or a ground conductor such as in the case of the antenna in FIG. 7B).

An iris board 903 is a ground plane (conductor) with a number of slots, such as slot 903a on top of and over dielectric 902. A slot may be referred to herein as an iris. In one embodiment, the slots in iris board 903 are created by etching. Note that in one embodiment, the highest density of slots, or the cells of which they are a part, is $\lambda/2$. In one embodiment, the density of slots/cells is $\lambda/3$ (i.e., 3 cells per $\lambda$). Note that other densities of cells may be used.

A patch board 905 containing a number of patches, such as patch 905a, is located over the iris board 903, separated by an intermediate dielectric layer. Each of the patches, such as patch 905a, are co-located with one of the slots in iris board 903. In one embodiment, the intermediate dielectric layer between iris board 903 and patch board 905 is a liquid crystal substrate layer 904. The liquid crystal acts as a dielectric layer between each patch and its co-located slot. Note that substrate layers other than LC may be used.

In one embodiment, patch board 905 comprises a printed circuit board (PCB), and each patch comprises metal on the PCB, where the metal around the patch has been removed.

In one embodiment, patch board 905 includes vias for each patch that is on the side of the patch board opposite the side where the patch faces its co-located slot. The vias are used to connect one or more traces to a patch to provide voltage to the patch. In one embodiment, matrix drive is used to apply voltage to the patches to control them. The voltage is used to tune or detune individual elements to effectuate beam forming.

Figure 20:
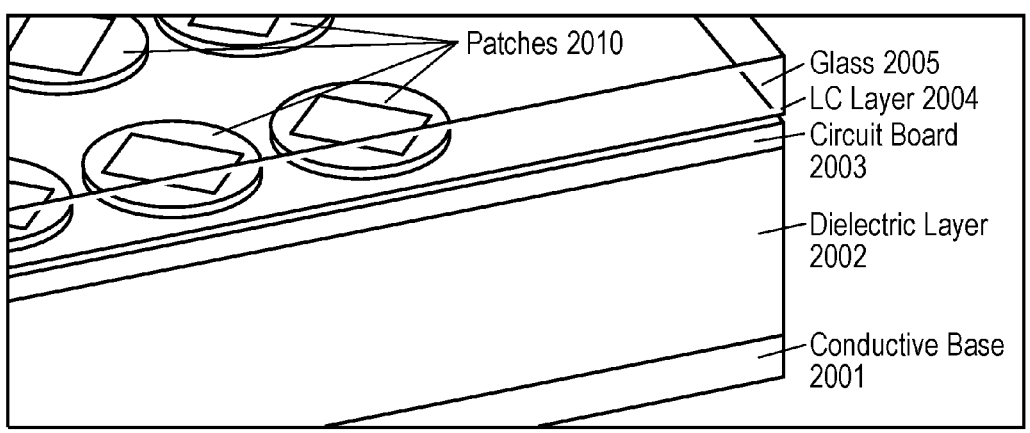
FIG. 20 illustrates a portion of a cylindrically fed antenna that includes a glass layer that contains the patches.

In one embodiment, the patches may be deposited on the glass layer (e.g., a glass typically used for LC displays (LCDs) such as, for example, Corning Eagle glass), instead of using a circuit patch board. FIG. 20 illustrates a portion of a cylindrically fed antenna that includes a glass layer that contains the patches. Referring to FIG. 20, the antenna includes conductive base or ground layer 2001, dielectric layer 2002 (e.g., plastic), iris board 2003 (e.g., a circuit board) containing slots, a liquid crystal substrate layer 2004, and a glass layer 2005 containing patches 2010. In one embodiment, the patches 2010 have a rectangular shape. In one embodiment, the slots and patches are positioned in rows and columns, and the orientation of patches is the same for each row or column while the orientation of the co-located slots are oriented the same with respect to each other for rows or columns, respectively.

In one embodiment, a cap (e.g., a radome cap) covers the top of the patch antenna stack to provide protection.

Figure 10:
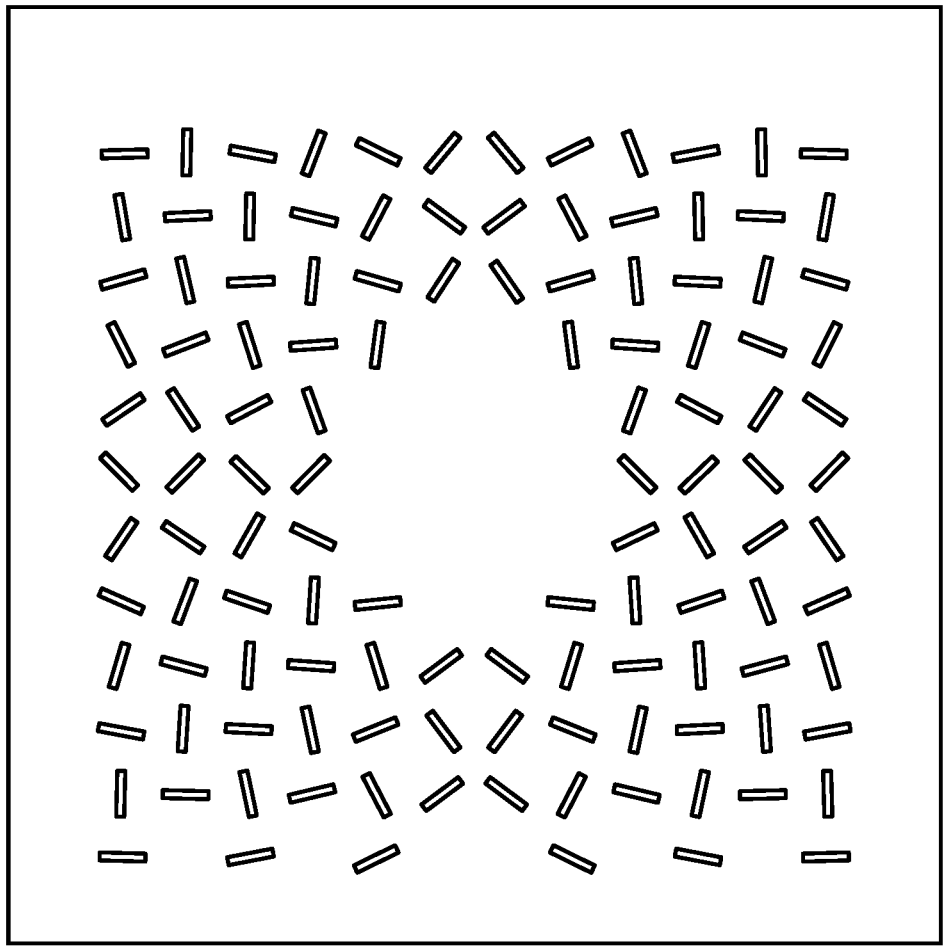
FIG. 10 illustrates one embodiment of an iris board showing slots and their orientation.

FIG. 10 illustrates one embodiment of iris board 903. This is a lower conductor of the CELCs. Referring to FIG. 10, the iris board includes an array of slots. In one embodiment, each slot is oriented either +45 or −45 relative to the impinging feed wave at the slot's central location. In other words, the layout pattern of the scattering elements (CELCs) are arranged at ±45 degrees to the vector of the wave. Below each slot is a circular opening 903b, which is essentially another slot. The slot is on the top of the iris board and the circular or elliptical opening is on the bottom of the iris board. Note that these openings, which may be about 0.001" or 25 mm in depth, are optional.

The slotted array is tunably directionally loaded. By turning individual slots off or on, each slot is tuned to provide the desired scattering at the operating frequency of the antenna (i.e., it is tuned to operate at a given frequency).

Figure 11:
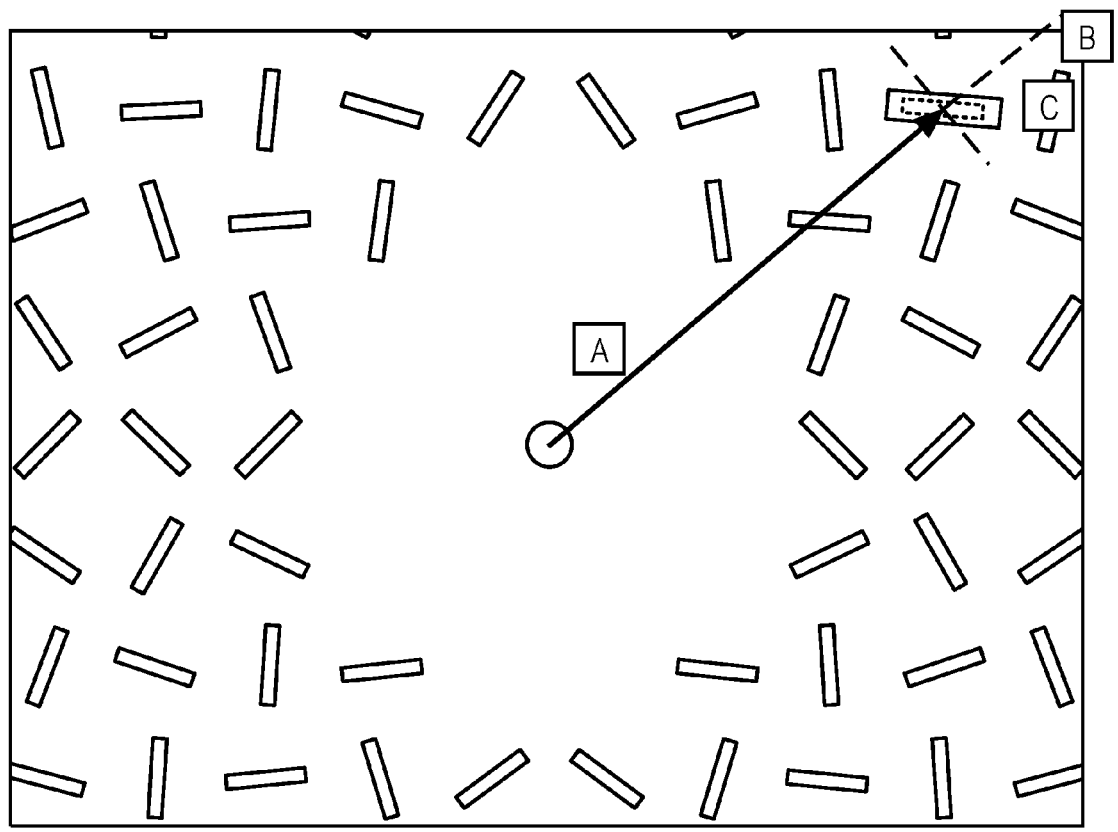
FIG. 11 illustrates the manner in which the orientation of one iris/patch combination is determined.

FIG. 11 illustrates the manner in which the orientation of one iris (slot)/patch combination is determined. Referring to FIG. 11, the letter A denotes a solid black arrow denoting power feed vector from a cylindrical feed location to the center of an element. The letter B denotes dashed orthogonal lines showing perpendicular axes relative to "A", and the letter C denotes a dashed rectangle encircling slot rotated 45 degrees relative to "B".

Figure 12:
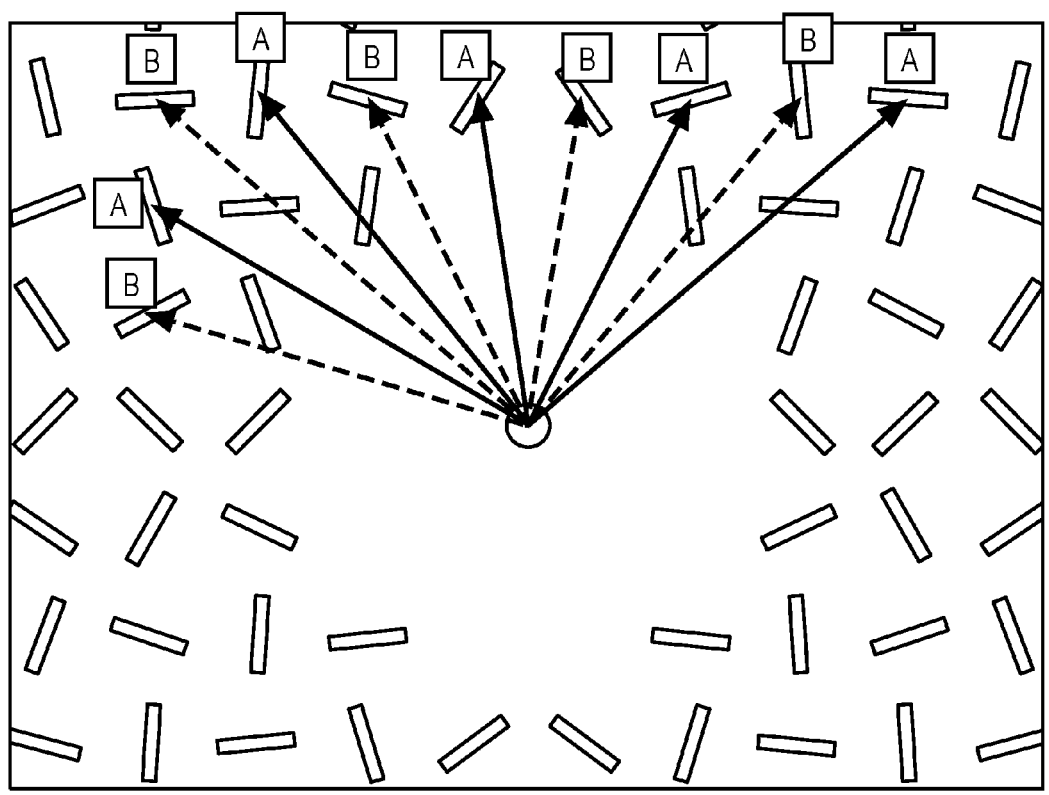
FIG. 12 illustrates irises grouped into two sets, with the first set rotated at −45 degrees relative to the power feed vector and the second set rotated +45 degrees relative to the power feed vector.

FIG. 12 illustrates irises (slots) grouped into two sets, with the first set rotated at −45 degrees relative to the power feed vector and the second set rotated +45 degrees relative to the power feed vector. Referring to FIG. 12, group A includes slots whose rotation relative to a feed vector is equal to −45°, while group B includes slots whose rotation relative to a feed vector is +45°.

Note that the designation of a global coordinate system is unimportant, and thus rotations of negative and positive angles are important only because they describe relative rotations of elements to each other and to the feed wave direction. To generate circular polarization from two sets of linearly polarized elements, the two sets of elements are perpendicular to each other and simultaneously have equal amplitude excitation. Rotating them +/−45 degrees relative to the feed wave excitation achieves both desired features at once. Rotating one set 0 degrees and the other 90 degrees would achieve the perpendicular goal, but not the equal amplitude excitation goal.

Figure 13:
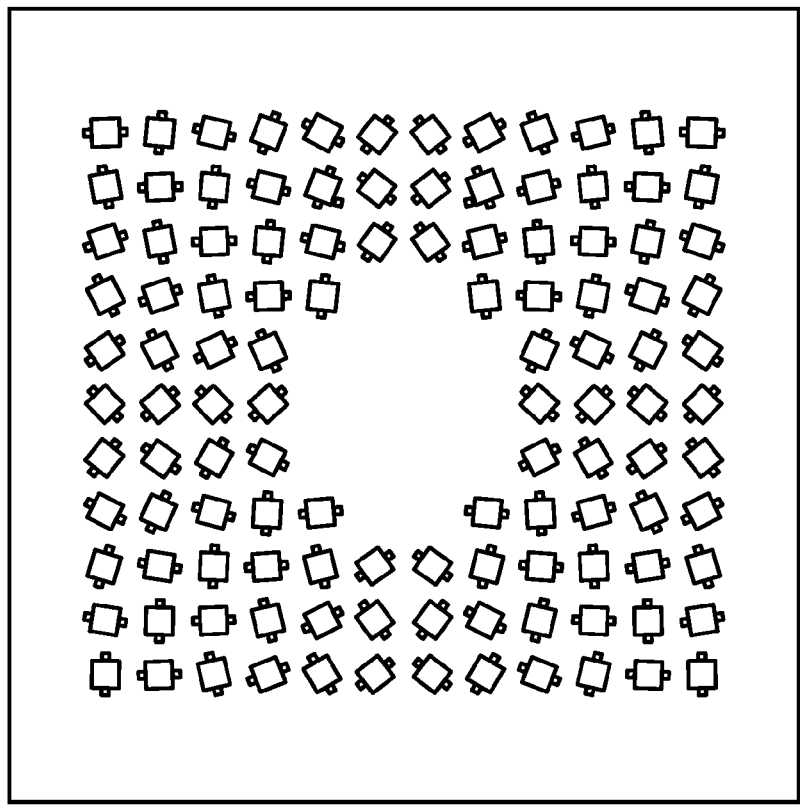
FIG. 13 illustrates an embodiment of a patch board.

FIG. 13 illustrates an embodiment of patch board 905. This is an upper conductor of the CELCs. Referring to FIG. 13, the patch board includes rectangular patches covering slots and completing linearly polarized patch/slot resonant pairs to be turned off and on. The pairs are turned off or on by applying a voltage to the patch using a controller. The voltage required is dependent on the liquid crystal mixture being used, the resulting threshold voltage required to begin to tune the liquid crystal, and the maximum saturation voltage (beyond which no higher voltage produces any effect except to eventually degrade or short circuit through the liquid crystal). In one embodiment, matrix drive is used to apply voltage to the patches in order to control the coupling.

The control structure has 2 main components; the controller, which includes drive electronics, for the antenna system, is below the wave scattering structure, while the matrix drive switching array is interspersed throughout the radiating RF array in such a way as to not interfere with the radiation. In one embodiment, the drive electronics for the antenna system comprise commercial off-the shelf LCD controls used in commercial television appliances that adjust the bias voltage for each scattering element by adjusting the amplitude of an AC bias signal to that element.

In one embodiment, the controller controls the electronics using software controls. In one embodiment, the control of the polarization is part of the software control of the antenna and the polarization is pre-programmed to match the polarization of the signal coming from the satellite service with which the earth station is communicating or be pre-programmed to match the polarization of the receiving antenna on the satellite.

In one embodiment, the controller also contains a microprocessor executing the software. The control structure may also incorporate sensors (nominally including a GPS receiver, a three axis compass and an accelerometer) to provide location and orientation information to the processor. The location and orientation information may be provided to the processor by other systems in the earth station and/or may not be part of the antenna system.

More specifically, the controller controls which elements are turned off and those elements turned on at the frequency of operation. The elements are selectively detuned for frequency operation by voltage application. A controller supplies an array of voltage signals to the RF radiating patches to create a modulation, or control pattern. The control pattern causes the elements to be turned on or off. In one embodiment, the control pattern resembles a square wave in which elements along one spiral (LHCP or RHCP) are "on" and those elements away from the spiral are "off" (i.e., a binary modulation pattern). In another embodiment, multistate control is used in which various elements are turned on and off to varying levels, further approximating a sinusoidal control pattern, as opposed to a square wave (i.e., a sinusoid gray shade modulation pattern). Some elements radiate more strongly than others, rather than some elements radiate and some do not. Variable radiation is achieved by applying specific voltage levels, which adjusts the liquid crystal permittivity to varying amounts, thereby detuning elements variably and causing some elements to radiate more than others.

The generation of a focused beam by the metamaterial array of elements can be explained by the phenomenon of constructive and destructive interference. Individual electromagnetic waves sum up (constructive interference) if they have the same phase when they meet in free space and waves cancel each other (destructive interference) if they are in opposite phase when they meet in free space. If the slots in a slotted antenna are positioned so that each successive slot is positioned at a different distance from the excitation point of the guided wave, the scattered wave from that element will have a different phase than the scattered wave of the previous slot. If the slots are spaced one quarter of a guided wavelength apart, each slot will scatter a wave with a one fourth phase delay from the previous slot.

Using the array, the number of patterns of constructive and destructive interference that can be produced can be increased so that beams can be pointed theoretically in any direction plus or minus ninety degrees (90°) from the bore sight of the antenna array, using the principles of holography. Thus, by controlling which metamaterial unit cells are turned on or off (i.e., by changing the pattern of which cells are turned on and which cells are turned off), a different pattern of constructive and destructive interference can be produced, and the antenna can change the direction of the wave front. The time required to turn the unit cells on and off dictates the speed at which the beam can be switched from one location to another location.

The polarization and beam pointing angle are both defined by the modulation, or control pattern specifying which elements are on or off. In other words, the frequency at which to point the beam and polarize it in the desired way are dependent upon the control pattern. Since the control pattern is programmable, the polarization can be programmed for the antenna system. The desired polarization states are circular or linear for most applications. The circular polarization states include spiral polarization states, namely right-hand circular polarization and left-hand circular polarization, which are shown in FIGS. 21A and 21B, respectively, for a feed wave fed from the center and travelling outwardly. Note that to get the same beam while switching feed directions (e.g., going from an ingoing feed to an outgoing feed), the orientation, or sense, or the spiral modulation pattern is reversed. Note that the direction of the feed wave (i.e. center or edge fed) is also specified when stating that a given spiral pattern of on and off elements to result in left-hand or right-hand circular polarization.

The control pattern for each beam will be stored in the controller or calculated on the fly, or some combination thereof. When the antenna control system determines where the antenna is located and where it is pointing, it then determines where the target satellite is located in reference to the bore sight of the antenna. The controller then commands an on and off pattern of the individual unit cells in the array that corresponds with the preselected beam pattern for the position of the satellite in the field of vision of the antenna.

In one embodiment, the antenna system produces one steerable beam for the uplink antenna and one steerable beam for the downlink antenna.

Figure 14:
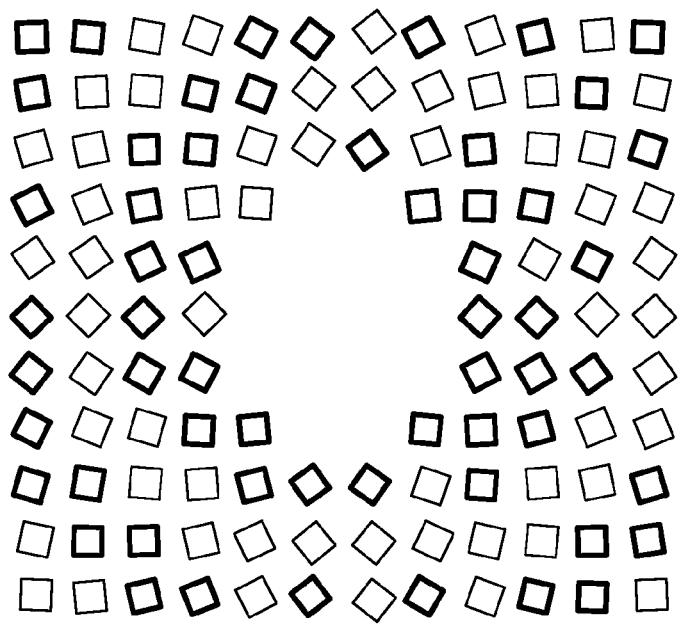
FIG. 14 illustrates an example of elements with patches in FIG. 13 that are determined to be off at frequency of operation.
Figure 15:
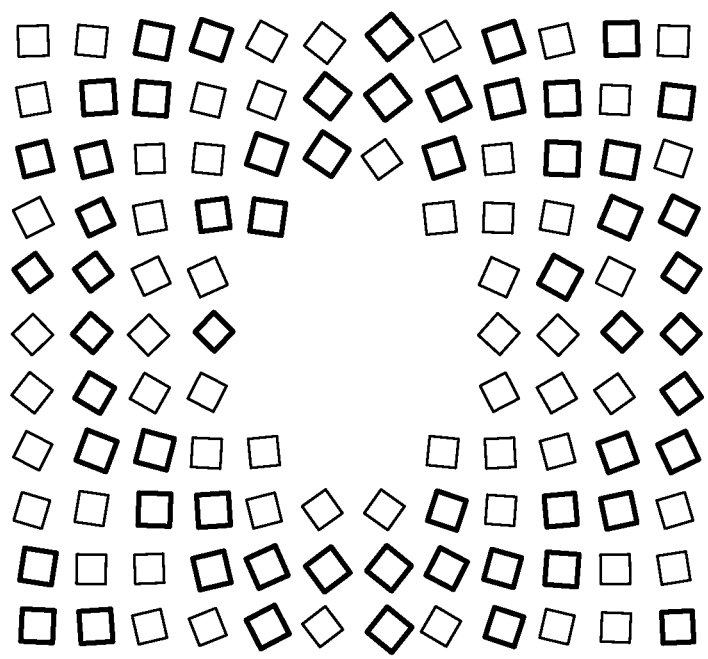
FIG. 15 illustrates an example of elements with patches in FIG. 13 that are determined to be on at frequency of operation.
Figure 16:
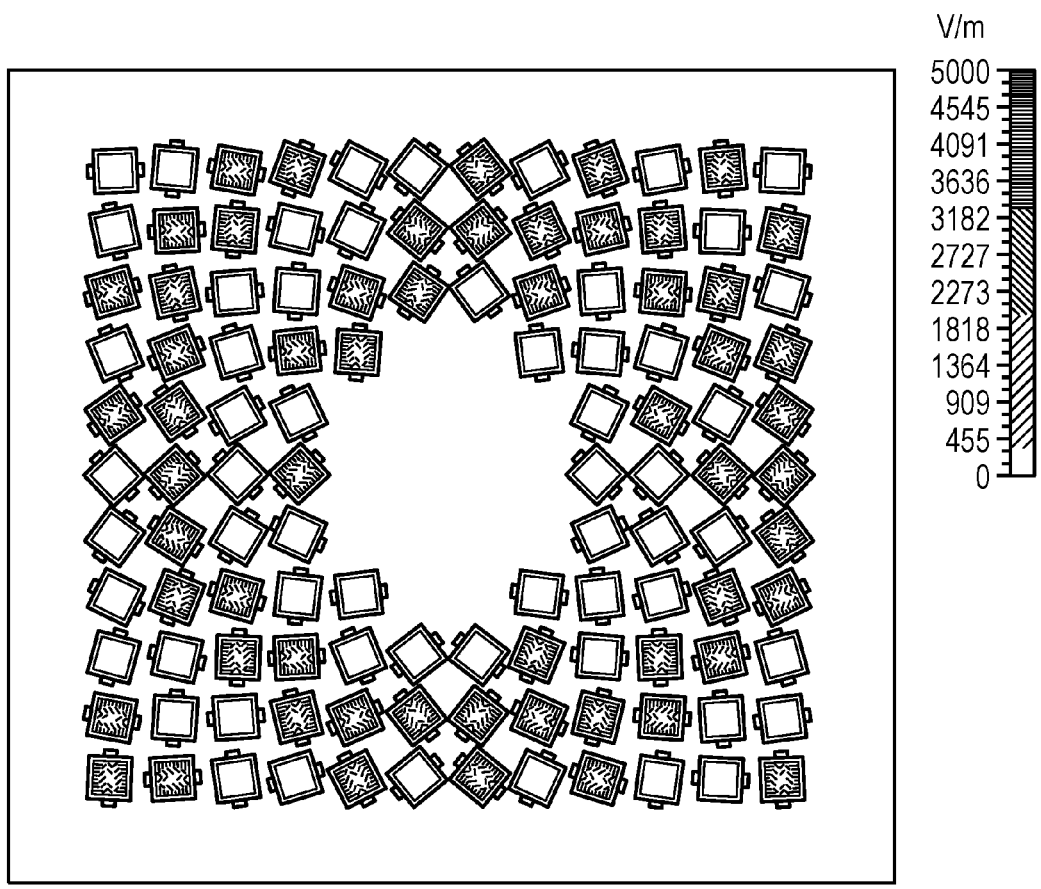
FIG. 16 illustrates the results of full wave modeling that show an electric field response to an on and off control/modulation pattern with respect to the elements of FIGS. 14 and 15.

FIG. 14 illustrates an example of elements with patches in FIG. 13 that are determined to be off at frequency of operation, and FIG. 15 illustrates an example of elements with patches in FIG. 13 that are determined to be on at frequency of operation. FIG. 16 illustrates the results of full wave modeling that show an electric field response to the on and off modulation pattern with respect to the elements of FIGS. 14 and 15.

Figure 17:
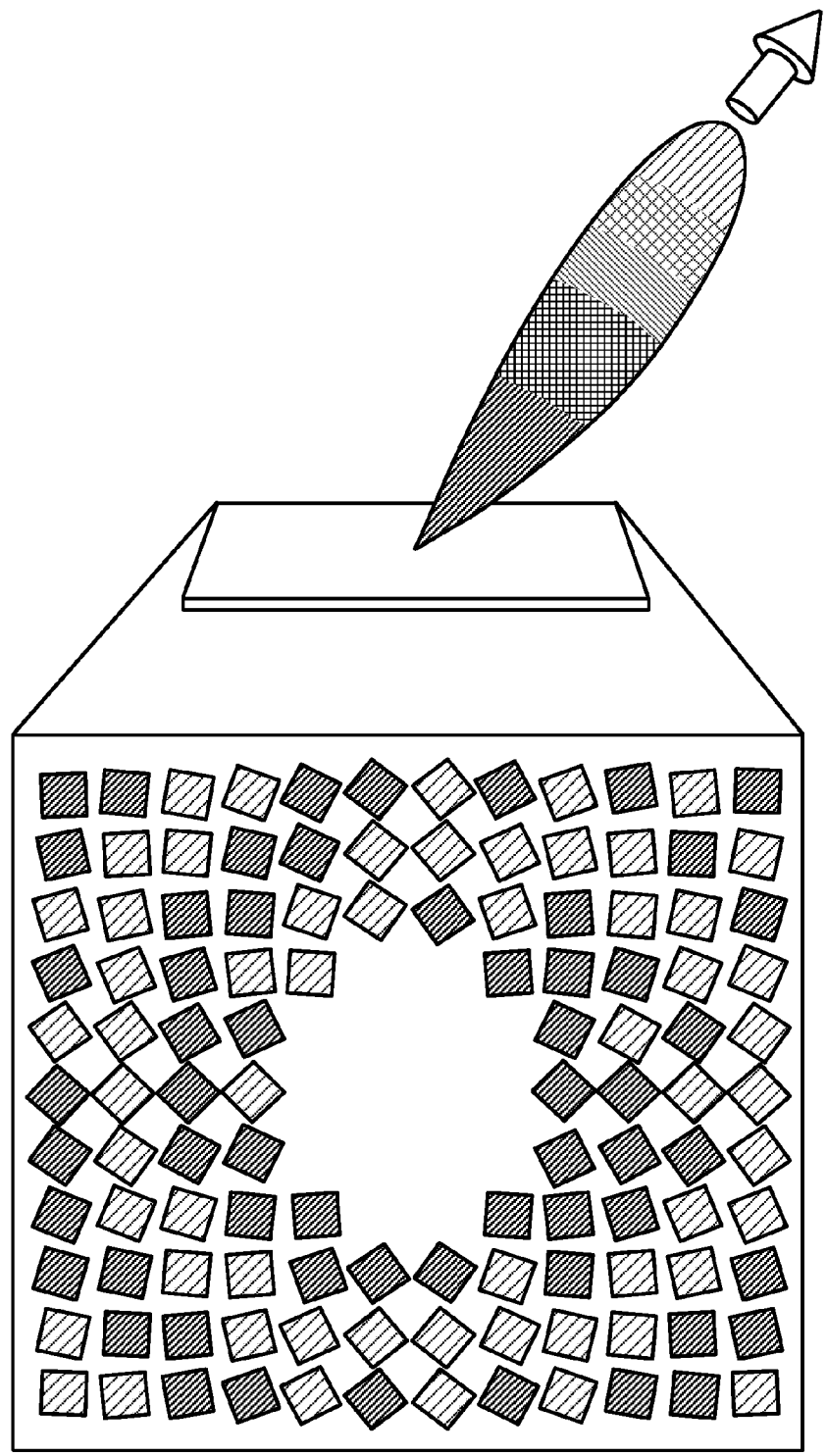
FIG. 17 illustrates beam forming using an embodiment of a cylindrically fed antenna.

FIG. 17 illustrates beam forming. Referring to FIG. 17, the interference pattern may be adjusted to provide arbitrary antenna radiation patterns by identifying an interference pattern corresponding to a selected beam pattern and then adjusting the voltage across the scattering elements to produce a beam according the principles of holography. The basic principle of holography, including the terms "object beam" and "reference beam", as commonly used in connection with these principles, is well-known. RF holography in the context of forming a desired "object beam" using a traveling wave as a "reference beam" is performed as follows.

Figure 23A:
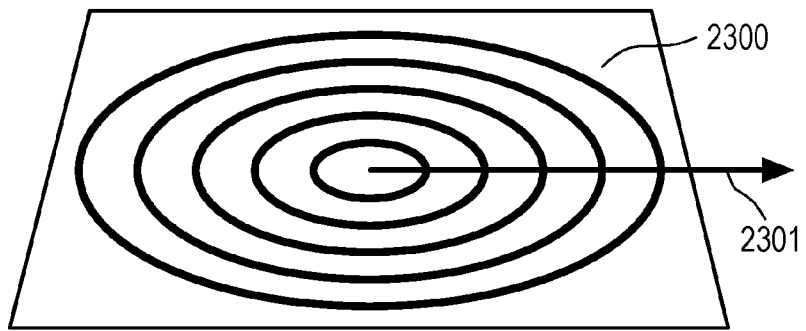
FIG. 23A illustrates an example of a reference wave.

The modulation pattern is determined as follows. First, a reference wave (beam), sometimes called the feed wave, is generated. FIG. 23A illustrates an example of a reference wave. Referring to FIG. 23A, rings 2300 are the phase fronts of the electric and magnetic fields of a reference wave. They exhibit sinusoidal time variation. Arrow 2301 illustrates the outward propagation of the reference wave.

In this example, a TEM, or Transverse Electro-Magnetic, wave travels either inward or outward. The direction of propagation is also defined and for this example outward propagation from a center feed point is chosen. The plane of propagation is along the antenna surface.

Figure 23B:
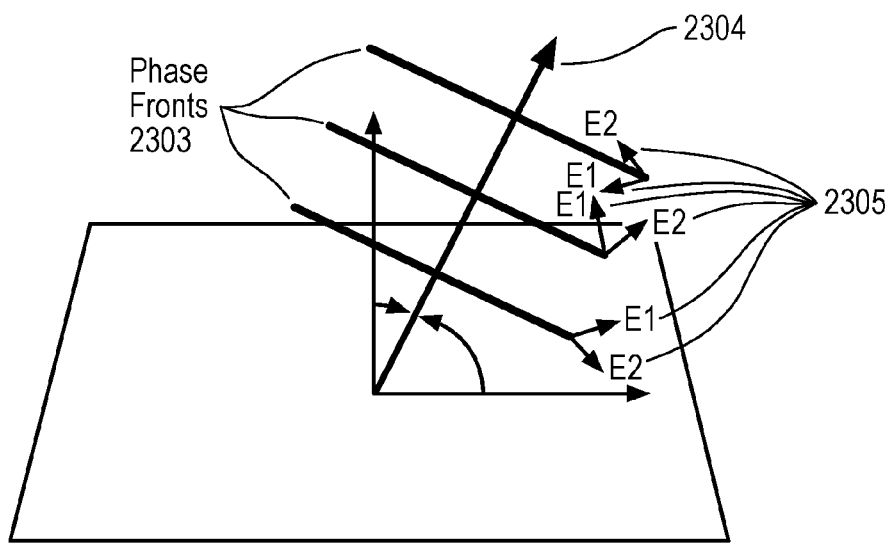
FIG. 23B illustrates a generated object wave.

An object wave, sometimes called the object beam, is generated. In this example, the object wave is a TEM wave travelling in direction 30 degrees off normal to the antenna surface, with azimuth set to 0 deg. The polarization is also defined and for this example right handed circular polarization is chosen. FIG. 23B illustrates a generated object wave. Referring to FIG. 23B, phase fronts 2303 of the electric and magnetic fields of the propagating TEM wave 2304 are shown. Arrows 2305 are the electric field vectors at each phase front, represented at 90 degree intervals. In this example, they adhere to the right hand circular polarization choice.

Figure 23C:
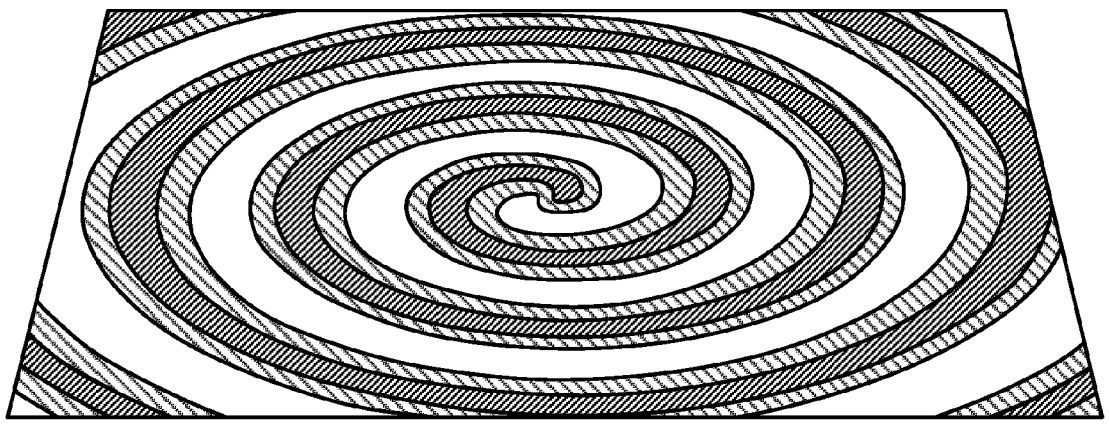
FIG. 23C is an example of the resulting sinusoidal modulation pattern.

When a sinusoid is multiplied by the complex conjugate of another sinusoid and the real part is taken, the resulting modulation pattern is also a sinusoid. Spatially, where the maxima of the reference wave meets the maxima of the object wave (both sinusoidally time-varying quantities), the modulation pattern is a maxima, or a strongly radiating site. In practice, this interference is calculated at each scattering location and is dependent on not just the position, but also the polarization of the element based on its rotation and the polarization of the object wave at the location of the element. FIG. 23C is an example of the resulting sinusoidal modulation pattern.

Note that a choice can further be made to simplify the resulting sinusoidal gray shade modulation pattern into a square wave modulation pattern. Note that the voltage across the scattering elements is controlled by adjusting the voltage applied between the patches and the ground plane, which in this context is the metallization on the top of the iris board.

Figure 18A:
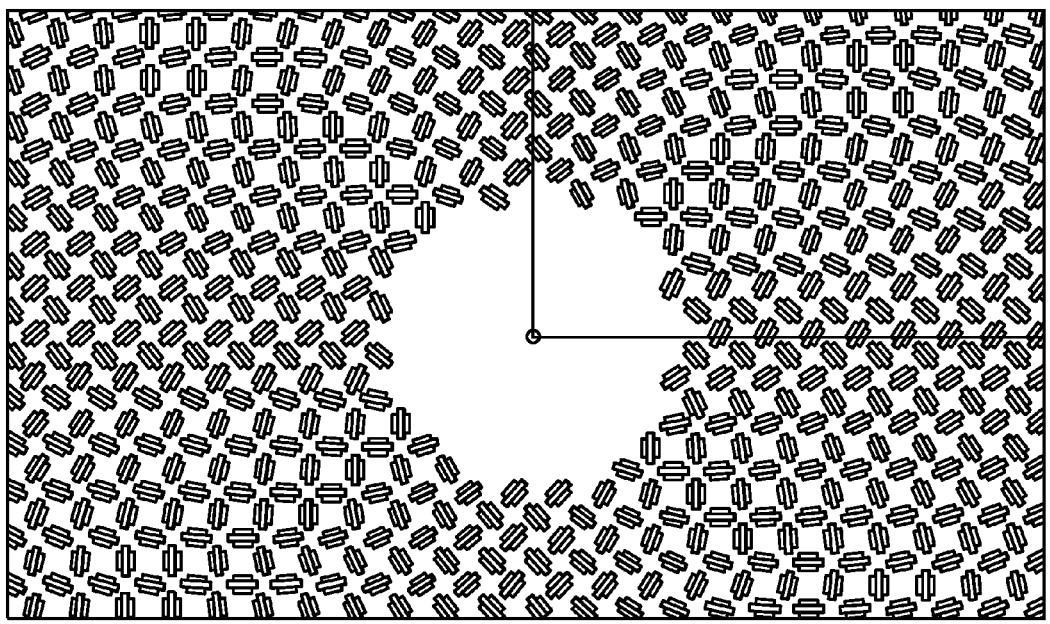
FIGS. 18A and 18B illustrate patches and slots positioned in a honeycomb pattern.
Figure 18B:
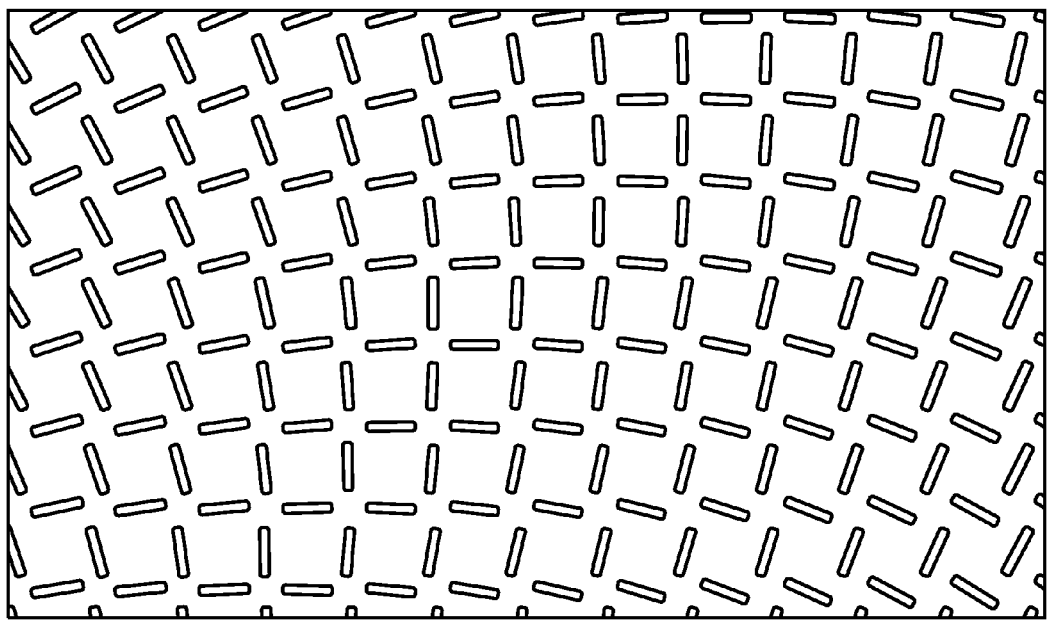

In one embodiment, the patches and slots are positioned in a honeycomb pattern. Examples of such a pattern are shown in FIGS. 18A and 18B. Referring to FIGS. 18A and 18B, honeycomb structures are such that every other row is shifted left or right by one half element spacing or, alternatively, every other column is shifted up or down by one half the element spacing.

Figure 19A:
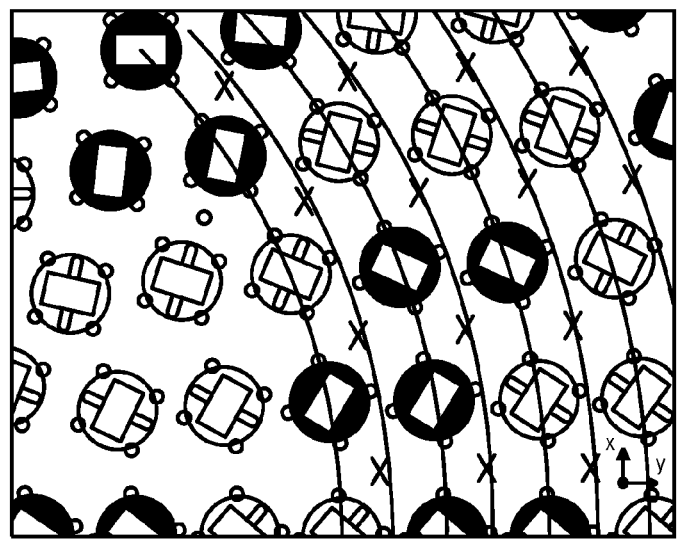
FIGS. 19A-C illustrate patches and associated slots positioned in rings to create a radial layout, an associated control pattern, and resulting antenna response.

In one embodiment, the patches and associated slots are positioned in rings to create a radial layout. In this case, the slot center is positioned on the rings. FIG. 19A illustrates an example of patches (and their co-located slots) being positioned in rings. Referring to FIG. 19A, the centers of the patches and slots are on the rings and the rings are concentrically located relative to the feed or termination point of the antenna array. Note that adjacent slots located in the same ring are oriented almost 90° with respect to each other (when evaluated at their center). More specifically, they are oriented at an angle equal to 90° plus the angular displacement along the ring containing the geometric centers of the 2 elements.

Figure 19B:
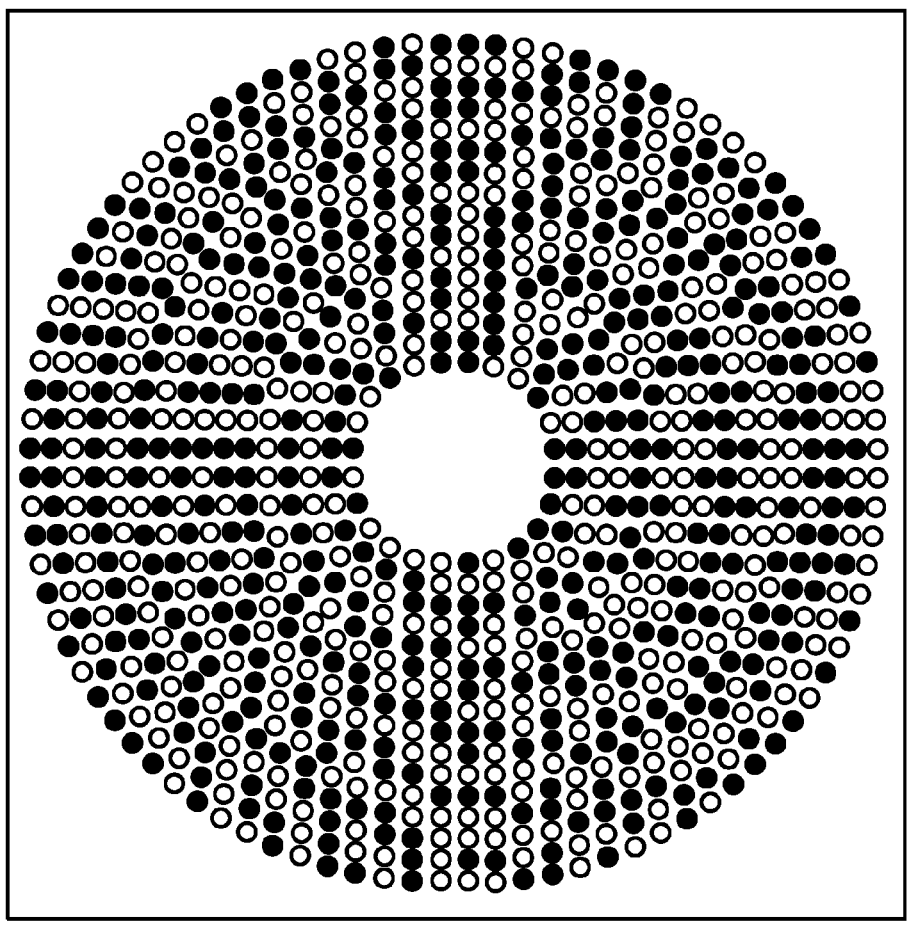
Figure 19C:
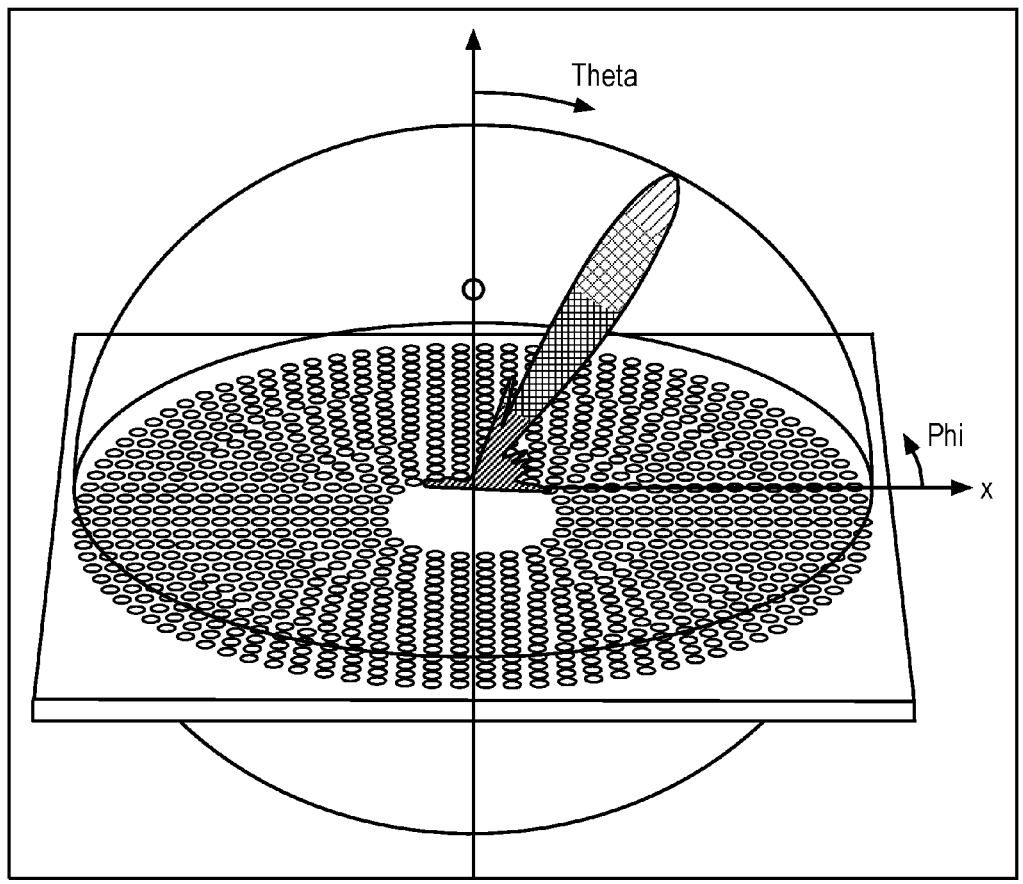

FIG. 19B is an example of a control pattern for a ring based slotted array, such as depicted in FIG. 19A. The resulting near fields and far fields for a 30° beam pointing with LHCP are shown in FIG. 19C, respectively.

In one embodiment, the feed structure is shaped to control coupling to ensure the power being radiated or scattered is roughly constant across the full 2D aperture. This is accomplished by using a linear thickness taper in the dielectric, or analogous taper in the case of a ridged feed network, that causes less coupling near the feed point and more coupling away from the feed point. The use of a linear taper to the height of the feed counteracts the 1/r decay in the travelling wave as it propagates away from the feed point by containing the energy in a smaller volume, which results in a greater percentage of the remaining energy in the feed scattering from each element. This is important in creating a uniform amplitude excitation across the aperture. For non-radially symmetric feed structures such as those having a square or rectangular outer dimension, this tapering can be applied in a non-radially symmetric manner to cause the power scattered to be roughly constant across the aperture. A complementary technique requires elements to be tuned differently in the array based on how far they are from the feed point.

One example of a taper is implemented using a dielectric in a Maxwell fish-eye lens shape producing an inversely proportional increase in radiation intensity to counteract the 1/r decay.

FIG. 22 illustrates a linear taper of a dielectric. Referring to FIG. 22, a tapered dielectric 2202 is shown having a coaxial feed 2200 to provide a concentric feed wave to execute elements (patch/iris pairs) of RF array 2201. Dielectric 2202 (e.g., plastic) tapers in height from a greatest height near coaxial feed 2200 to a lower height at the points furthest away from coaxial feed 2200. For example, height B is greater than the height A as it is closer to coaxial feed 2200.

In keeping with this idea, in one embodiment, dielectrics are formed with a non-radially symmetric shape to focus energy where needed. For example, in the case of a square antenna fed from a single feed point as described herein, the path length from the center to a corner of a square is 1.4 times longer than from the center to the center of a side of a square. Therefore, more energy must be focused toward the 4 corners than toward the 4 halfway points of the sides of the square, and the rate of energy scattering must also be different. Non-radially symmetric shaping of the feed and other structures can accomplish these requirements In one embodiment, dissimilar dielectrics are stacked in a given feed structure to control power scattering from feed to aperture as wave radiates outward. For example, the electric or magnetic energy intensity can be concentrated in a particular dielectric medium when more than 1 dissimilar dielectric media are stacked on top of each other. One specific example is using a plastic layer and an air-like foam layer whose total thickness is less than $\lambda\_eff/2$ at the operation frequency, which results in higher concentration of magnetic field energy in the plastic than the air-like foam.

In one embodiment, the control pattern is controlled spatially (turning on fewer elements at the beginning, for instance) for patch/iris detuning to control coupling over the aperture and to scatter more or less energy depending on direction of feeding and desired aperture excitation weighting. For example, in one embodiment, the control pattern used at the beginning turns on fewer slots than the rest of the time. For instance, at the beginning, only a certain percentage of the elements (e.g., 40%, 50%) (patch/iris slot pairs) near the center of the cylindrical feed that are going to be turned on to form a beam are turned on during a first stage and then the remaining are turned that are further out from the cylindrical feed. In alternative embodiments, elements could be turned on continuously from the cylindrical feed as the wave propagates away from the feed. In another embodiment, a ridged feed network replaces the dielectric spacer (e.g., the plastic of spacer 704) and allows further control of the orientation of propagating feed wave. Ridges can be used to create asymmetric propagation in the feed (i.e., the Poynting vector is not parallel to the wave vector) to counteract the 1/r decay. In this way, the use of ridges within the feed helps direct energy where needed. By directing more ridges and/or variable height ridges to low energy areas, a more uniform illumination is created at the aperture. This allows a deviation from a purely radial feed configuration because the direction of propagation of the feed wave may no longer be oriented radially. Slots over a ridge couple strongly, while those slots between the ridges couple weakly. Thus, depending on the desired coupling (to obtain the desired beam), the use of ridge and the placement of slots allows control of coupling.

In yet another embodiment, a complex feed structure that provides an aperture illumination that is not circularly symmetric is used. Such an application could be a square or generally non-circular aperture which is illuminated non-uniformly. In one embodiment, a non-radially symmetric dielectric that delivers more energy to some regions than to others is used. That is, the dielectric can have areas with different dielectric controls. One example of is a dielectric distribution that looks like a Maxwell fish-eye lens. This lens would deliver different amounts of power to different parts of the array. In another embodiment, a ridged feed structure is used to deliver more energy to some regions than to others.

In one embodiment, multiple cylindrically-fed sub-aperture antennas of the type described here are arrayed. In one embodiment, one or more additional feed structures are used. Also in one embodiment, distributed amplification points are included. For example, an antenna system may include multiple antennas such as those shown in FIG. 7A or 7B in an array. The array system may be 3×3 (9 total antennas), 4×4, 5×5, etc., but other configurations are possible. In such arrangements, each antenna may have a separate feed. In an alternative embodiment, the number of amplification points may be less than the number of feeds.

One advantage to embodiments of the present invention architecture is better beam performance than linear feeds. The natural, built-in taper at the edges can help to achieve good beam performance.

In array factor calculations, the FCC mask can be met from a 40 cm aperture with only on and off elements.

With the cylindrical feed, embodiments of the invention have no impedance swing near broadside, no band-gap created by 1-wavelength periodic structures. Embodiments of the invention have no diffractive mode problems when scanning off broadside.

There are (at least) two element designs which can be used in the architecture described herein: circularly polarized elements and pairs of linearly polarized elements. Using pairs of linearly polarized elements, the circular polarization sense can be changed dynamically by phase delaying or advancing the modulation applied to one set of elements relative to the second. To achieve linear polarization, the phase advance of one set relative to the second (physically orthogonal set) will be 180 degrees. Linear polarizations can also be synthesized with only element patter changes, providing a mechanism for tracking linear polarization On-off modes of operation have opportunities for extended dynamic and instantaneous bandwidths because the mode of operation does not require each element to be tuned to a particular portion of its resonance curve. The antenna can operate continuously through both amplitude and phase hologram portions of its range without significant performance impact. This places the operational range much closer to total tunable range.

The cylindrical feed structure can take advantage of a TFT architecture, which implies functioning on quartz or glass. These substrates are much harder than circuit boards, and there are better known techniques for achieving gap sizes around 3 um. A gap size of 3 um would result in a 14 ms switching speed.

Disclosed architectures described herein require no machining work and only a single bond stage in production.

This, combined with the switch to TFT drive electronics, eliminates costly materials and some tough requirements.

Figure 25:
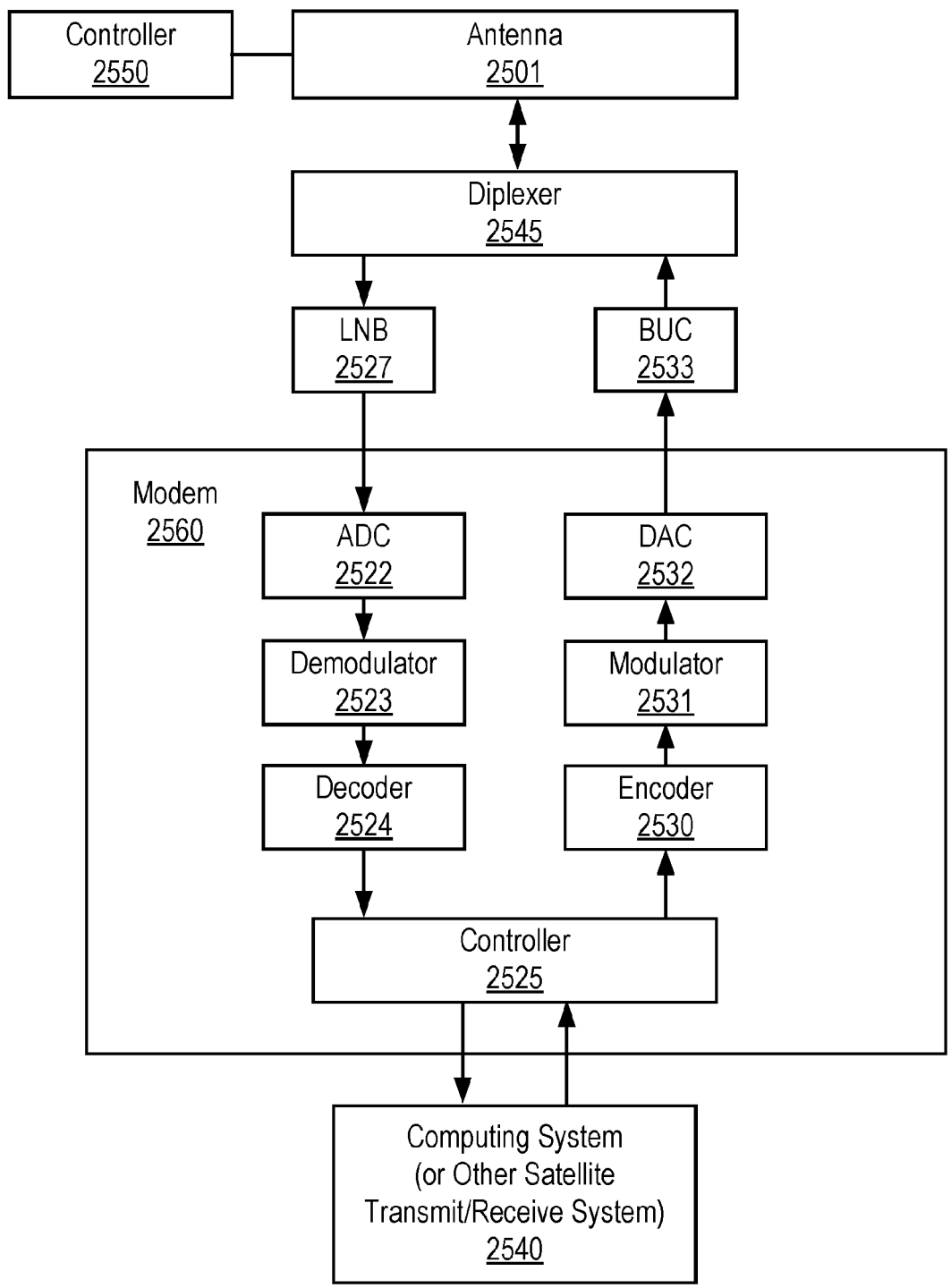
FIG. 25 is a block diagram illustrating features of a communication system according to an embodiment.

FIG. 25 is a block diagram of a communication system having transmit and receive paths according to an embodiment. The communication system of FIG. 25 may include features of system 100, for example. While one transmit path and one receive path are shown, the communication system may include only one of a receive path and a transmit path or, alternatively, may include more than one transmit path and/or more than one receive path.

Referring to FIG. 25, antenna 2501 includes one or more antenna panels operable to transmit and receive satellite communications—e.g., simultaneously at different respective frequencies. In one embodiment, antenna 2501 is coupled to diplexer 2545. The coupling may be by one or more feeding networks. In the case of a radial feed antenna, diplexer 2545 may combine the two signals—e.g., wherein a connection between antenna 2501 and diplexer 2545 includes a single broad-band feeding network that can carry both frequencies.

Diplexer 2545 may be coupled to a low noise block down converter (LNBs) 2527 to perform a noise filtering function and a down conversion and amplification function—e.g., including operations adapted from techniques known in the art. In one embodiment, LNB 2527 is in an out-door unit (ODU). In another embodiment, LNB 2527 is integrated into the antenna apparatus. LNB 2527 may be coupled to a modem 2560, which may be further coupled to computing system 2540 (e.g., a computer system, modem, etc.).

Modem 2560 may include an analog-to-digital converter (ADC) 2522, which may be coupled to LNB 2527, to convert the received signal output from diplexer 2545 into digital format. Once converted to digital format, the signal may be demodulated by demodulator 2523 and decoded by decoder 2524 to obtain the encoded data on the received wave. The decoded data may then be sent to controller 2525, which sends it to computing system 2540.

Modem 2560 may additionally or alternatively include an encoder 2530 that encodes data to be transmitted from computing system 2540. The encoded data may be modulated by modulator 2531 and then converted to analog by digital-to-analog converter (DAC) 2532. The analog signal may then be filtered by a BUC (up-convert and high pass amplifier) 2533 and provided to one port of diplexer 2545. In one embodiment, BUC 2533 is in an out-door unit (ODU). Diplexer 2545 may support operations adapted from conventional interconnect techniques to provide the transmit signal to antenna 2501 for transmission.

Controller 2550 may control antenna 2501, including controller 2550 transmitting signals to configure beam steering, beamforming, frequency tuning and/or other operational characteristics of one or more antenna elements. Note that the full duplex communication system shown in FIG. 25 has a number of applications, including but not limited to, internet communication, vehicle communication (including software updating), etc.

Techniques and architectures for positioning (and in some embodiments, attaching) a communication terminal are described herein. In the above description, for purposes of explanation, numerous specific details are set forth in order to provide a thorough understanding of certain embodiments. It will be apparent, however, to one skilled in the art that certain embodiments can be practiced without these specific details. In other instances, structures and devices are shown in block diagram form in order to avoid obscuring the description.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Some portions of the detailed description herein are presented in terms of algorithms and symbolic representations of operations on data bits within a computer memory. These algorithmic descriptions and representations are the means used by those skilled in the computing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the discussion herein, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Certain embodiments also relate to apparatus for performing the operations herein. This apparatus may be specially constructed for the required purposes, or it may comprise a general purpose computer selectively activated or reconfigured by a computer program stored in the computer. Such a computer program may be stored in a non-transitory computer readable storage medium, such as, but is not limited to, any type of disk including floppy disks, optical disks, CD-ROMs, and magnetic-optical disks, read-only memories (ROMs), random access memories (RAMs) such as dynamic RAM (DRAM), EPROMs, EEPROMs, magnetic or optical cards, or any type of media suitable for storing electronic instructions, and coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description herein. In addition, certain embodiments are not described with reference to any particular programming language. It will be appreciated that a variety of programming languages may be used to implement the teachings of such embodiments as described herein.

Besides what is described herein, various modifications may be made to the disclosed embodiments and implementations thereof without departing from their scope. Therefore, the illustrations and examples herein should be construed in an illustrative, and not a restrictive sense. The scope of the invention should be measured solely by reference to the claims that follow.

What is claimed is:

1. An apparatus comprising:
a housing;
an electronically steerable antenna disposed in the housing, the electronically steerable antenna to communicate signals through the housing; and
a plurality of support legs each hingedly coupled to the housing, wherein, for each support leg of the plurality of support legs:
the support leg is configured to rotate about a respective first axis which is fixed relative to the housing;
the support leg is configured to further rotate about a respective second axis which is variable with rotation of the support leg about the respective first axis.

2. The apparatus of claim 1, wherein the plurality of support legs includes a first support leg and a second support leg, wherein the plurality of support legs is configured to provide a respective first rotation of the second support leg in response to a respective first rotation of the first support leg.

3. The apparatus of claim 2, wherein the plurality of support legs is further configured to provide a respective second rotation of the second support leg in response to a respective second rotation of the first support leg.

4. The apparatus of claim 1, wherein the plurality of support legs includes a first support leg and a second support leg, wherein the plurality of support legs is configured to provide a respective second rotation of the second support leg in response to a respective second rotation of the first support leg.

5. The apparatus of claim 1, wherein the plurality of support legs includes a first support leg, the apparatus further comprising an actuator operable by a user to selectively enable or disable a respective first rotation of the first support leg.

6. The apparatus of claim 5, wherein the plurality of support legs further includes a second support leg, wherein the plurality of support legs is configured to enable the respective first rotation of the first support leg only while a respective second rotation of the first support leg is disabled.

7. The apparatus of claim 5, wherein the plurality of support legs further includes a second support leg, wherein the actuator is operable by the user to further selectively enable or disable a respective first rotation of the second support leg.

8. The apparatus of claim 5, further comprising another actuator operable by the user to selectively enable or disable a respective second rotation of the first support leg.

9. The apparatus of claim 1, wherein the plurality of support legs includes a first support leg, the apparatus further comprising an actuator operable by a user to selectively enable or disable a respective second rotation of the first support leg.

10. The apparatus of claim 9, wherein the plurality of support legs further includes a second support leg, wherein the plurality of support legs is configured to enable the respective second rotation of the first support leg only while a respective first rotation of the first support leg is disabled.

11. The apparatus of claim 9, wherein the plurality of support legs further includes a second support leg, wherein the actuator is operable by the user to further selectively enable or disable a respective second rotation of the second support leg.

12. The apparatus of claim 1, the apparatus further comprising an actuator operable by a user to selectively enable or disable one of a respective first rotation of the first support leg or a respective second rotation of the first support leg, wherein the actuator moves with the respective first rotation of the first support leg, and wherein the actuator moves with the respective second rotation of the first support leg.

13. A method comprising:
communicating signals through a housing with an electronically steerable antenna which is disposed in the housing; and
positioning the housing and the electronically steerable antenna with a plurality of support legs each hingedly coupled to the housing, the positioning including, for each of the plurality of support legs:
rotating the support leg about a respective first axis which is fixed relative to the housing; and
rotating the support leg about a respective second axis which is variable with rotation of the support leg about the respective first axis.

14. The method of claim 13, wherein the plurality of support legs includes a first support leg and a second support leg, wherein a respective first rotation of the second support leg is in response to a respective first rotation of the first support leg.

15. The method of claim 14, wherein a respective second rotation of the second support leg is in response to a respective second rotation of the first support leg.

16. The method of claim 13, wherein the plurality of support legs includes a first support leg and a second support leg, wherein a respective second rotation of the second support leg is in response to a respective second rotation of the first support leg.

17. The method of claim 13, wherein the plurality of support legs includes a first support leg, the method further comprising selectively enabling or disabling a respective first rotation of the first support leg.

18. The method of claim 17, wherein the plurality of support legs further includes a second support leg, wherein the respective first rotation of the first support leg is enabled only while a respective second rotation of the first support leg is disabled.

19. The method of claim 17, wherein the plurality of support legs further includes a second support leg, the method further comprising selectively enabling or disabling a respective first rotation of the second support leg.

20. The method of claim 17, the method further comprising selectively enabling or disabling a respective second rotation of the first support leg.

21. The method of claim 13, wherein the plurality of support legs includes a first support leg, the method further comprising selectively enabling or disabling a respective second rotation of the first support leg.

22. The method of claim 21, wherein the plurality of support legs further includes a second support leg, wherein the respective second rotation of the first support leg is enabled only while a respective first rotation of the first support leg is disabled.

23. The method of claim 21, wherein the plurality of support legs further includes a second support leg, the method further comprising selectively enabling or disabling a respective second rotation of the second support leg.

24. The method of claim 13, the method further comprising selectively enabling or disabling one of a respective first rotation of the first support leg or a respective second rotation of the first support leg, the selective enabling or disabling in response to operation of an actuator which moves with the respective first rotation of the first support leg, wherein the actuator further moves with the respective second rotation of the first support leg.

* * * * *